(12) United States Patent
Hayes et al.

(10) Patent No.: US 9,479,550 B2
(45) Date of Patent: Oct. 25, 2016

(54) SYSTEM FOR PROVIDING CONTINUITY OF BROADCAST BETWEEN CLIENTS AND METHOD THEREFOR

(75) Inventors: David Jeffery Hayes, Boynton Beach, FL (US); Eric Thomas Eaton, Lake Worth, FL (US); Von Alan Mock, Boynton Beach, FL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 2164 days.

(21) Appl. No.: 10/074,131

(22) Filed: Feb. 12, 2002

(65) Prior Publication Data

US 2003/0154242 A1    Aug. 14, 2003

(51) Int. Cl.

| | |
|---|---|
| H04N 7/18 | (2006.01) |
| H04L 29/06 | (2006.01) |
| H04N 21/2385 | (2011.01) |
| H04N 21/262 | (2011.01) |
| H04N 21/414 | (2011.01) |
| H04N 21/4227 | (2011.01) |
| H04N 21/475 | (2011.01) |
| H04N 21/64 | (2011.01) |
| H04L 29/08 | (2006.01) |
| H04H 20/14 | (2008.01) |
| H04L 12/18 | (2006.01) |

(52) U.S. Cl.
CPC ....... *H04L 65/4076* (2013.01); *H04L 12/1859* (2013.01); *H04L 29/06* (2013.01); *H04L 29/06027* (2013.01); *H04L 67/306* (2013.01); *H04N 21/2385* (2013.01); *H04N 21/26208* (2013.01); *H04N 21/41407* (2013.01); *H04N 21/4227* (2013.01); *H04N 21/4755* (2013.01); *H04N 21/64* (2013.01); *H04H 20/14* (2013.01); *H04L 12/1836* (2013.01); *H04L 69/329* (2013.01)

(58) Field of Classification Search
USPC ........ 725/131, 133–134, 139, 141, 151, 153
See application file for complete search history.

(56) References Cited

U.S. PATENT DOCUMENTS

| | | | |
|---|---|---|---|
| 5,930,473 A | 7/1999 | Teng et al. | |
| 6,151,632 A | 11/2000 | Chaddha et al. | |
| 6,167,235 A | 12/2000 | Sibecas et al. | |
| 2002/0049679 A1* | 4/2002 | Russell | G06F 21/10 705/52 |
| 2002/0069218 A1* | 6/2002 | Sull | G06F 17/30796 715/202 |
| 2005/0028207 A1* | 2/2005 | Finseth | H04N 7/17318 725/46 |
| 2006/0271993 A1* | 11/2006 | Nakata | H04L 12/2805 725/131 |

OTHER PUBLICATIONS

International Search Report mailed on May 13, 2003, on application No. PCT/US2003/02924.

* cited by examiner

*Primary Examiner* — Nasser Goodarzi
*Assistant Examiner* — Fred Peng
(74) *Attorney, Agent, or Firm* — Lowenstein Sandler LLP

(57) ABSTRACT

A communication system (10) comprises a plurality of clients (12) including a first client (18) and a second client (20). Within the communication system (10), continuity of one or more of a plurality of broadcast events (14) is provided between the plurality of clients (12). The first client (18) monitors a broadcast event (34). Thereafter, the second client (20) launches monitoring of the broadcast event (34) in response to an occurrence associated with the broadcast event (34).

81 Claims, 16 Drawing Sheets

SYSTEM FOR PROVIDING CONTINUITY OF BROADCAST BETWEEN CLIENTS AND METHOD THEREFOR

BACKGROUND OF THE INVENTION

1. Field of the Invention

This invention relates in general to communication systems and in particular to communication systems incorporating capabilities to provide continuity of monitoring broadcast events among a plurality of clients.

2. Description of the Related Art

Television viewing of sports events has become a national pastime worldwide. To meet the needs of sports fans, nationwide, regional and local sports programming is available on a multitude of sports channels. Sports fans interests include both live home team games and national sports events and programming. For example sports channels provide sports fans with live NBA, NHL, Major League Baseball, PGA Tour golf; bowling, ATP and WTA tennis action as well as continued home team coverage from the collegiate and scholastic levels. One sports network alone provides over 4,500 professional live events annually. Sports television is live television at its best. Fans of all descriptions sit on the edge of their seats, glued to the screen, anticipating the graceful reaction of an athlete at the peak of his or her ability. The combination of highly trained, determined athletes and the finely tuned teamwork of TV producers, commentators and technicians create compelling programs.

To meet the needs of sports fans not able to always be in front of their television, many sports network are now providing alternative viewing avenues. For example, access to sporting events is available through online website sources including sports news, information, listings, real-time sports score tracking, games and special features about sports programming. Further sports radio programs provide spectators with live action through audio channels. Viewer interaction with others viewing a particular sporting event is currently available through the Internet using their personal computers.

Recently, viewers have been given the opportunity for wireless participation in sporting events. For example, viewers during the Super Bowl XXXVI were given the opportunity to vote via their cell phones on action, controversial moments or predictions from the game. Savvy football fans around the world could have their opinions known on Internet-enabled wireless devices by navigating via the Internet through the use of short, memorable numbers instead of lengthy URIs. Thousands of fans used their web-enabled mobile phones, as well as their personal computers, to vote and to view overall poll results.

One problem with today's currently available technology is the inability for a sports fan to automatically and continuously track a sporting event they are watching on television when they need to become mobile. This problem also exists with other broadcast events like concerts or soap operas. A partial solution to this problem is described in U.S. Pat. No. 6,167,235, issued Dec. 26, 2000 to Sibecas et al. and titled "Method And Apparatus For Providing Additional Information To A Selective Call Device About A Broadcast" which is assigned to the assignee of the present invention, and which is incorporated by reference herein. This invention describes a technique in a selective call communication system and in a broadcast communication system to provide additional information about a broadcast to a selective call device. The transfer of connection information (e.g. URI, Information service address and sub-address) is covered by the described invention.

Recently, standards addressing the convergence of television and web-enabled devices have been emerging. One of the most popular of these standards is the Advanced Television Enhancement Forum (ATVEF); a specification developed and supported by some of the biggest names in the broadcasting, computer, and consumer electronics industries. ATVEF proposes a Web browser on a television set. Further, it proposes the insertion of web content into the television broadcast signal ATVEF uses mechanisms called triggers to alert receivers to incoming content enhancements. Triggers are sent over the broadcast medium and contain information about enhancements that are available to the user. Among other information, every trigger contains a standard Universal Resource Indicator (URI) that defines the location of the enhanced content. ATVEF content may be located locally—perhaps delivered over the broadcast network and cached to a disk—or it may reside on the Internet, another public network, or a private network. Although providing enhancement to television broadcasts, standards such as ATVEF do not address the requirement to continue viewing a broadcast once mobile.

One drawback to the above methods and systems is that it may be difficult to convince sports broadcasters to carry information in their video feed that would make it easier for someone to stop watching their program. Also, implementation within all sports programs of the extra information would take time, effort, and money.

The use of quality media (e.g. songs, images, and videos) in a sports score tracking application is useful; however there are problems with implementation. For example, since this content tends to be large, it is not desirable to transfer this data over a wide area wireless network because of the higher cost and longer download time associated with this channel. The typical solution to this problem would be to reduce the "richness" of the media or to use "canned content." Use of canned content is typically performed by storing in the device all of the media that may want to be presented to the user such as images of team members, images of team uniforms, audio of team songs, video of teams scoring, and team names. The stored content is then references by the broadcast to indicate when to present it to the user. However, due to its large file size and wide variety of possible content, it is not desirable to permanently store all possible media in the device.

Therefore, what is needed is a system and method for the transferring of broadcast information between different clients allowing the seamless viewing of a broadcasted event.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
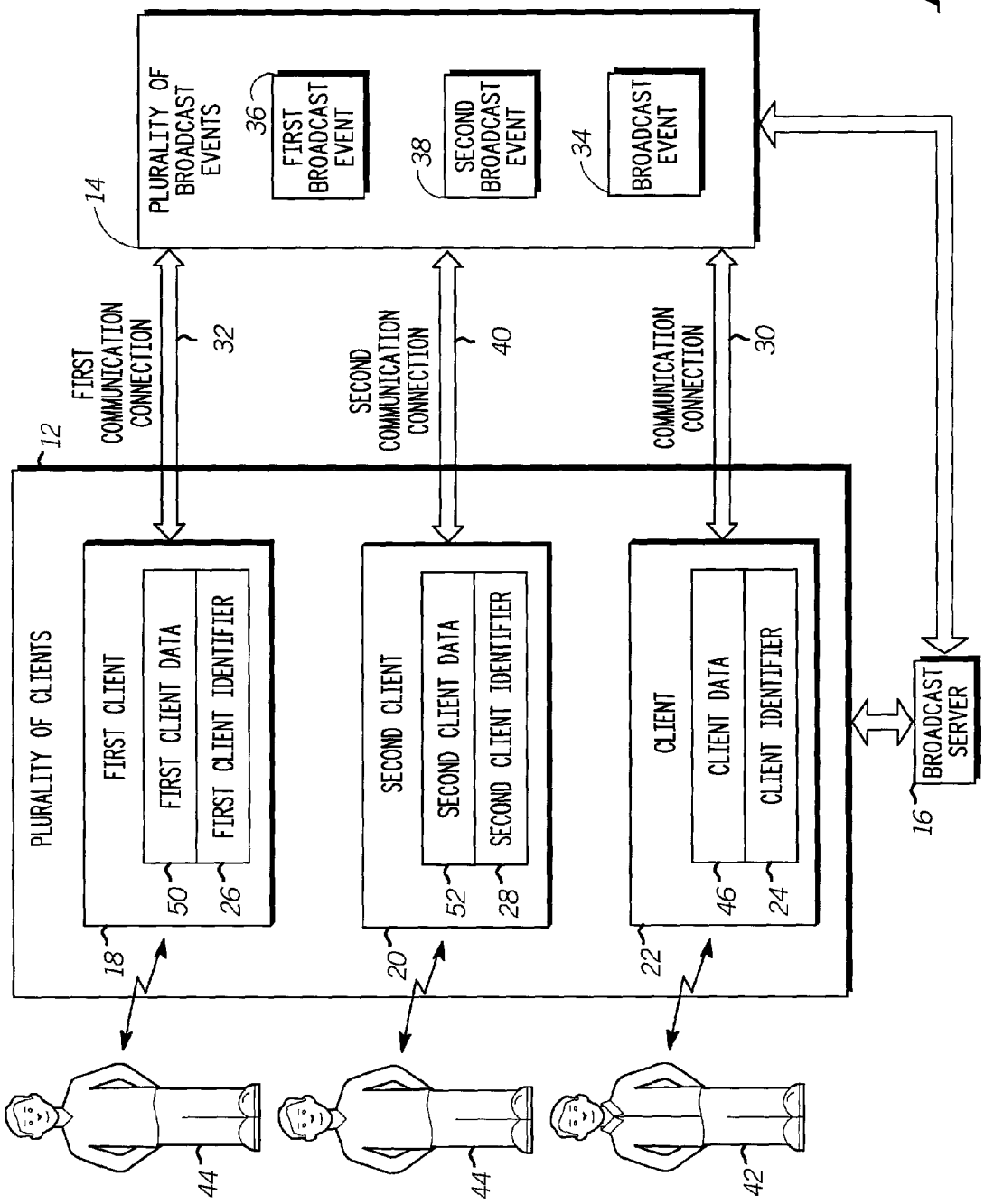
FIG. 1 is an electronic block diagram of a communication system, in accordance with the preferred embodiment of the present invention.

Referring to FIG. 1, an electronic block diagram of a communication system 10 in accordance with the present invention is shown. As illustrated, the communication system 10 preferably includes a plurality of clients 12 for monitoring one or more of a plurality of broadcast events 14. Each broadcast event of the plurality of broadcast events 14 can be, for example, a sports game, a simulcast concert, a television program (such as a soap opera), a networked program, a radio program, or an equivalent. A networked program can include, for example, streaming video, streaming audio, streaming text, intermittently transmitted video, intermittently transmitted images, intermittently transmitted audio, intermittently transmitted text, or an equivalent, all of which is delivered to one or more of the plurality of clients. It will be appreciated by one of ordinary skill in the art that the broadcast event can be any of those mentioned herein or an equivalent. Each of the plurality of clients 12 such as a first client 18 and a second client 20 includes client software to interface within the communication system 10. Each of the plurality of clients 12 can be a client residing on a user's device such as a personal computer, a television, a cable set top box, a satellite set top box, a wireless handheld device (such as a cellular telephone, a FM radio, a satellite radio, a handheld computer, or an equivalent) an xDSL home gateway, a satellite gateway, a wireless gateway, or an equivalent. It will be appreciated by one of ordinary skill in the art that in accordance with the present invention, the interface capabilities of the client software can also be designed into client hardware of a client 22. Each client 22 of the plurality of clients 12 further includes a client identifier 24. For example, the first client 18 includes a first client identifier 26 and the second client 20 includes a second client identifier 28. The client identifier 24 of the client 22 is a unique identification within the communication system 10 for directing information and data to a particular client within a particular device in which the client operates. For example, the client identifier 24 can be a mobile device address, an IP address and number of the port, a MAC (Media Access Control) address, or a Bluetooth device address. To monitor at least one of the plurality of broadcast events 14, the client 22 establishes a communication connection 30. For example, the first client 18 establishes a first communication connection 32 for monitoring at least one broadcast event 34 of the plurality of broadcast events 14 such as a first broadcast event 36 and/or a second broadcast event 38. Similarly, the second client 20 establishes a second communication connection 40 for monitoring at least one of the plurality of broadcast events 14. It will be appreciated by one of ordinary skill in the art that the communication connection 30, the first communication connection 32, and the second communication connection 40 can be a physical connection, or alternatively can be a logical connection where the act of connecting and disconnecting is a logical one. Further, each communication connection can be made via a one-way communication medium such as tuning a FM radio, a satellite radio, or a television to a particular channel, or a paging device monitoring for particular messages. Alternatively, each communication connection can be a two-way communication medium such as Digital Subscriber Line (DSL), cable television, wireless data, or analog modem. It will be appreciated by one of ordinary skill in the art that each communication connection can be made using one or a combination of communication media mentioned herein or an equivalent. Each client 22 of the plurality of clients 12 is operated by at least one account user 42. The account user 42 is an individual who uses one or more clients to monitor the plurality of broadcast events 14. It will be appreciated by one of ordinary skill in the art that the account user 42 can monitor one or more of the plurality of broadcast events 14 and/or communicate within the communication system 10 using one or more of the plurality of clients 12. For example, a first account user 44 can monitor one or more of the plurality of broadcast events 14 using the first client 18, and, in accordance with the present invention, also using the second client 20. Similarly, the first account user 44 can monitor one or more of the plurality of broadcast events 14 using the first client 18, and, in accordance with the present invention, transfer the monitoring of the broadcast events from the first client 18 to the second client 20.

Each client 22 preferably includes a plurality of client data 46. The plurality of client data 46 includes data associated with the client 22 and data associated with each broadcast event 34 for which the client 22 is currently monitoring or plans to monitor. For example, the first client 18 includes a first client data 50 and the second client 20 includes a second client data 52.

Figure 2:
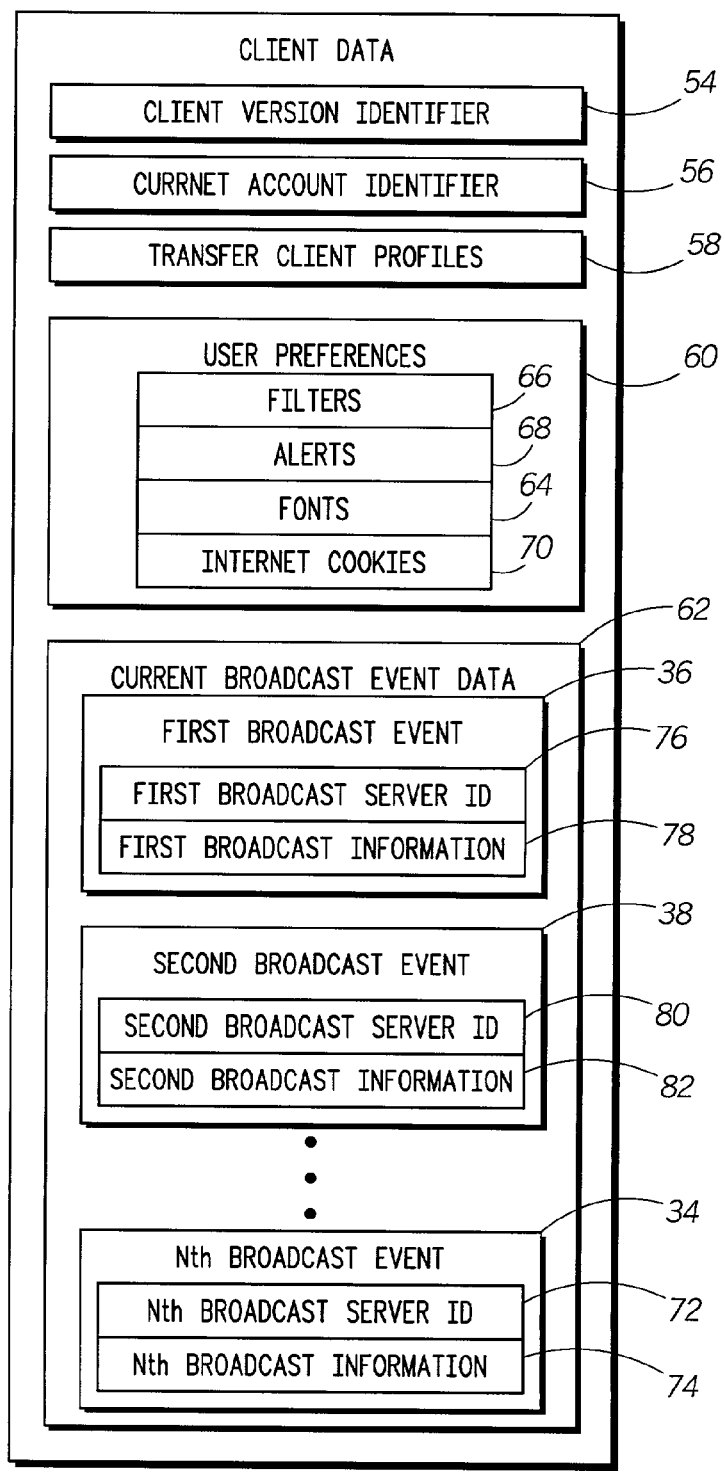
FIG. 2 illustrates a plurality of client data for use in the communication system of FIG. 1 in accordance with the preferred embodiment of the present invention.

FIG. 2 illustrates one embodiment of the plurality of client data 46 in accordance with the present invention. It will be appreciated by one of ordinary skill in the art that the plurality of client data 46 as illustrated in FIG. 2 can also be the first client data 50 or the second client data 52. As illustrated, the plurality of client data 46 preferably includes a client version identifier 54, a current account identifier 56, a plurality of transfer client profiles 58, a plurality of user preferences 60, and one or more broadcast events data 62. It will be appreciated by one of ordinary skill in the art that the plurality of client data 46 can include any of the client data mentioned herein or an equivalent.

The client version identifier 54 is preferably the name and version or other similar indication of the client 22 being used. The current account identifier 56 is preferably a user name or other identification of the account user 42 currently using the client 22.

The plurality of user preferences 60 defines certain attributes settable by the account user 42 for monitoring the plurality of broadcast events 14 and/or for communicating within the communication system 10 using the client 22. The plurality of user preferences 60, for example, can include text font attributes 64, filter settings 66, blocking settings, screen names per account identifier, and alert settings 68. It will be appreciated by one of ordinary skill in the art that the plurality of user preferences 60, in accordance with the present invention, can include any of those preferences mentioned herein or an equivalent.

In one embodiment of the present invention, the plurality of user preferences 60 includes a plurality of Internet cookies 70. The client 22 receives each of the plurality of Internet cookies 70, which is essentially a tagged string of text containing the user's preferences for each broadcast event for which the client 22 is monitoring.

The current broadcast events data 62 contains information relating to each of the plurality of broadcast events 14 for which the account user 42 is currently monitored or plans to monitor using the client 22. The current broadcast event data 62 preferably includes a broadcast server identification 72 and a plurality of broadcast information 74 for each broadcast event 34 being monitored by the client 22. It will be appreciated by one of ordinary skill in the art that, additionally, the client 22 can include a default broadcast server identification which is associated with all broadcast events not having an identified associated broadcast server identification. (not shown) For example, a first broadcast server identification 76 and a plurality of first broadcast information 78 are stored within the current broadcast events data 62 for the first broadcast event 36. Similarly, a second broadcast server identification 80 and a plurality of second broadcast event information 82 for the second broadcast event 38 are stored within the current broadcast events data 62. The broadcast server identification 72, such as the first broadcast server identification 76 and the second broadcast server identification 80 can be, for example, a unique selective call address in a wireless messaging system or a telephone number. Alternatively, the broadcast server identification 72 can be routing information that can be converted to an IPv4, MAC or IPv6 address and an associated number of the port assigned to the server associated with the broadcast event 34. It will be appreciated by one of ordinary skill in the art that the broadcast server identification 72 can be one mentioned herein or an equivalent. The broadcast server identification 72 enables the client 22 to access a broadcast server 16 wherein information relating to the broadcast event 34 can be found.

Figure 3:
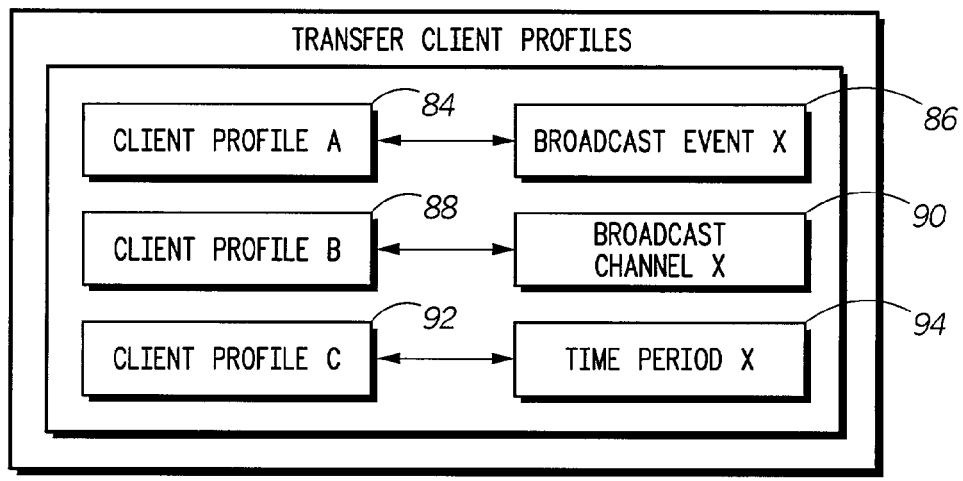
FIGS. 3 and 4 illustrate further detail of the plurality of client data of FIG. 2 in accordance with the preferred embodiment of the present invention.

FIG. 3 illustrates further details of the plurality of transfer client profiles 58 of FIG. 2. The plurality of transfer client profiles 58 preferably includes a client profile for each of the plurality of clients 12 for which the client 22 can transfer the monitoring of one or more broadcast event as required and/or desired. Each of the plurality of transfer client profiles 58 can, for example, include the connection type used for communication with the specific client (wide area network, short range wireless, infrared data association (IrDA), Universal Serial Bus (USB), or serial). If a wide or local area network was used for communication, the client profile can further include routing information that can be converted to an IPv4, MAC or IPv6 address. A user friendly name such as Uniform Resource Identifiers (URI), phone number or other where a Domain Name Server (DNS) can be used to access a database to obtain the routable information (IP addressing). The client profile can also include information pertaining to the monitoring capabilities of the client including connection types the client is capable of using to monitor a broadcast event, media types the client is capable of using to monitor a broadcast event, applications the client has installed which can monitor a broadcast event, indications of the applications which can be installed to monitor a broadcast event. According to the present invention, a client profile can be stored separately or, in one embodiment, stored with a link to one or more attributes. For example, as illustrated in FIG. 3, client profile A 84 can be linked with at least one broadcast event such as a broadcast event X 86. Similarly, client profile B 88 can be linked with at least one broadcast channel such as a broadcast channel X 90. Similarly, client profile C 92 can be linked with at least one time period such as a time period 94. Similarly, a client profile can be linked with other attributes such as a broadcast event type (such as sports or music) or an available broadcast event monitoring connections (such as streaming MPEG (Moving Picture Expert Group) video, streaming MP3, or cellular broadcast text messages). It will be appreciated by one of ordinary skill in the art that, in accordance with the present invention, each client profile can be linked with one or more of the attributes mentioned herein or an equivalent.

Figure 4:
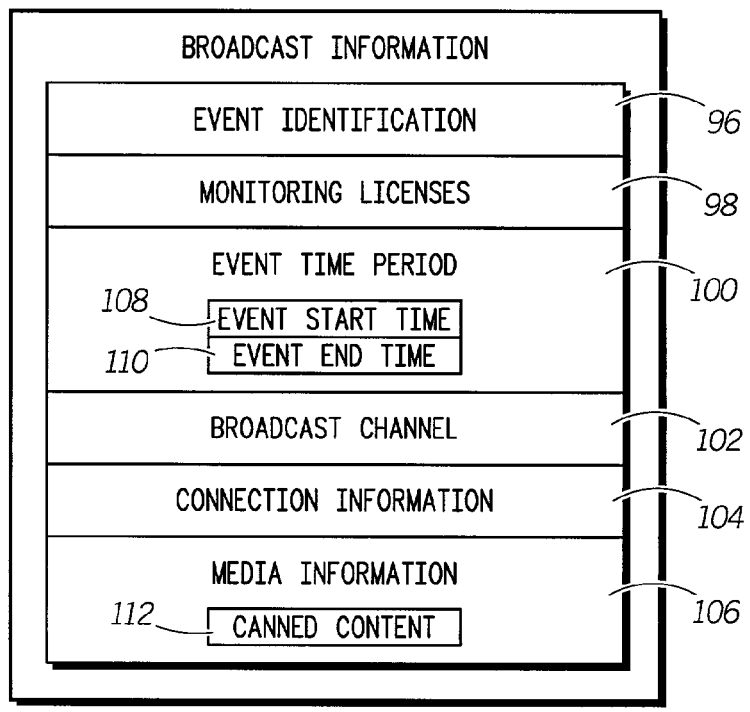

FIG. 4 illustrates the plurality of broadcast information 74 stored within the plurality of client data 46 of FIG. 2. Those skilled in the art will recognize that the illustration of FIG. 4 can further be the first broadcast information 78 associated with the first broadcast event 36, the second broadcast information 82 associated with the second broadcast event 38, or broadcast information for any of the plurality of broadcast events 14. Preferably, the plurality of broadcast information 74 includes an event identification 96, a monitoring license 98, an event time period 100 (preferably including an event start time 108 and an event end time 110), a broadcast channel 102, a plurality of connection information 104, and a plurality of media information 106. It will be appreciated by one of ordinary skill in the art that the plurality of broadcast information 74, in accordance with the present invention, can include any of the broadcast information mentioned herein or an equivalent.

The plurality of connection information 104 can include, for example, a navigational path to information about the broadcast event of interest, a navigational path to a media stream that monitors the broadcast event of interest, and/or a navigational path to information on how to connect to one or more media streams that monitor the broadcast event of interest. The navigational path can be for example a Uniform Resource Identifier (URI). URIs are short strings that refer to resources in the Internet computer network including documents, images, downloadable files, services, electronic mailboxes, streaming video, streaming audio, streaming text, and other resources. They make resources available under a variety of naming schemes and access methods (such as HTTP (Hypertext Transfer Protocol), FTP (File Transfer Protocol), and Internet protocol) addressable in the same simple way. Alternatively, the plurality of connection information 106 can include a plurality of communication media channels such as a telephone number, a FM radio station, a satellite television channel or an equivalent. (not shown) The account user 42 can choose the optimum resource for monitoring the content based on the type of device in which the client 22 is operating. For example, A 2G mobile device can have a URI entry for a WAP (Wireless Application Protocol) server that will provide push SMS (short message service) messages about the game while a 3G mobile device can use the URI entry for the WAP server or connect directly to a server that can provide streaming media of the game. Alternatively, the device can automatically determine the optimum method for monitoring the broadcast event 34 based on the device's capabilities, the richness of the content, and/or the costs associated with monitoring.

The plurality of media information 106, for example, can include a plurality of canned content 112 associated with the broadcast event 34. Similarly, the plurality of media information 106 can include a navigational path to retrieve the plurality of canned content 112 associated with the broadcast event 34. (not shown) An example of the plurality of canned content 112 is an animation of a particular team making a touchdown that is stored and displayed on a device in which the client 22 operates when the football team scores a touchdown. The plurality of media information 106, similarly, can include other content associated with the broadcast event 34 that can be available to the account user 42 dependent upon the type of device in which the client 22 is operating. For example, the plurality of media information 106 can be SMS messages about the game sent to a mobile device. Similarly, if the account user 42 also plays fantasy football, SMS messages such as information on fantasy football as games are being played can be sent to the mobile device while still the client 22 continues receiving information on the football game the account user 42 is currently monitoring.

Referring back to FIG. 1, in a preferred embodiment of the present invention, the communication system 10 further includes a broadcast server 16 coupled to both the plurality of clients 12 and the plurality of broadcast events 14. The broadcast server 16 facilitates monitoring of the plurality of broadcast events 14 by the plurality of clients 12 within the communication system 10. The broadcast server 16 provides numerous services to manage the monitoring of the plurality of broadcast events 14 by the plurality of clients 12. The broadcast server 16 also offers various options to the account user 42 to reduce cost or enhance the features of monitoring of one or more of the plurality of broadcast events 14. For example, when the account user 42 requires and/or desires to transfer monitoring of one or more of the plurality of broadcast events 14 from the first client 18 to the second client 20, the broadcast server 16 can send the plurality of broadcast information 74 to the second client 20 in response to receiving a request from either the first client 18, the second client 20, or both. The broadcast server 16 can manage the various security issues such as user authentication, single use licenses, and the like.

Figure 5:
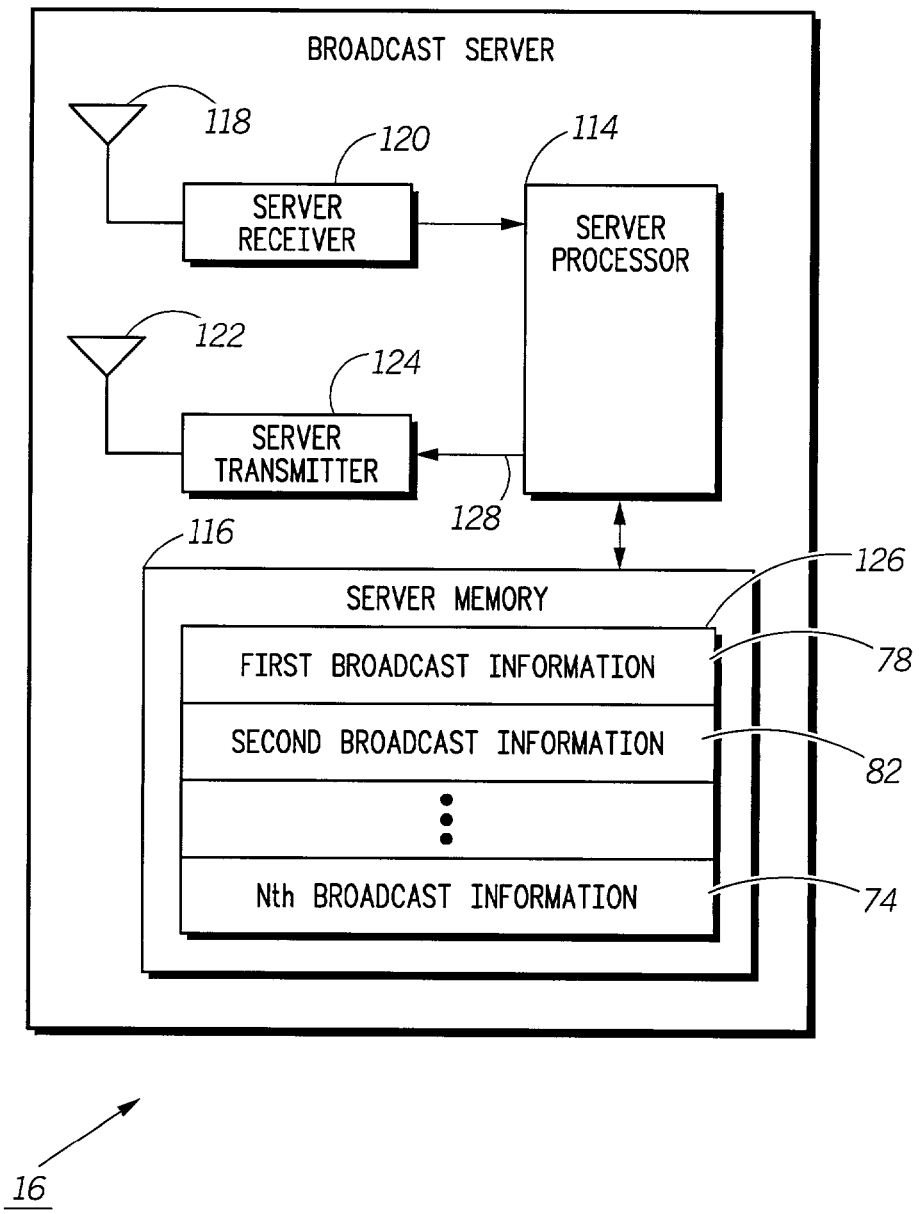
FIG. 5 is an electronic block diagram of a broadcast server for use within the communication system of FIG. 1 in accordance with the preferred embodiment of the present invention.

FIG. 5 is an electronic block diagram of the broadcast server 16 for use within the communication system 10 of FIG. 1 in accordance with the present invention. The broadcast server 16 preferably includes a server processor 114, a server memory 116, a first server antenna 118, a server receiver 120, a second server antenna 122, and a server transmitter 124.

The first server antenna 118 intercepts transmitted signals from the plurality of clients 12 of the communication system 10. The first server antenna 118 is coupled to the server receiver 120, which employs conventional demodulation techniques for receiving the communication signals from communication system 10. Coupled to the server receiver 120, is the server processor 114, utilizing conventional signal processing techniques for processing received requests. Preferably, the server processor 114 is similar to the MC68328 microcontroller manufactured by Motorola, Inc. of Schaumburg, Ill. It will be appreciated that other similar processors can be utilized for the server processor 114, and that additional processors of the same or alternative type can be added as required for handling the processing requirements of the server processor 114.

To perform the necessary functions of the broadcast server 16, the server processor 114 is coupled to the server memory 116, which preferably includes a random access memory (RAM), a read-only memory (ROM), and an electrically erasable programmable read-only memory (EEPROM). The server memory 116 preferably stores a plurality of assigned broadcast information 126 for a plurality of assigned broadcast events such as the first broadcast information 78, the second broadcast information 82 and any other broadcast information 74 for broadcast events for which the broadcast server 16 manages. The server transmitter 124 is coupled to the server processor 114 and is responsive to a transmission command 128 from the server processor 114. When the server transmitter 124 receives the transmission command 128 from the server processor 114, the server transmitter 124 sends a response via the second server antenna 122. The broadcast server 16, for example, can operate as follows: the server receiver 120 receives a request for at least a portion of the plurality of assigned broadcast information 126 stored in the server memory 116. The server processor 114 processes the received request and sends the transmission command 128 to the server transmitter 124. The server transmitter 124 thereafter sends the plurality of broadcast information as requested to a specified client operating within a specified device.

Although the broadcast server 16 as described and illustrated in FIG. 5 is a wireless server, it will be appreciated by one of ordinary skill in the art that alternatively, the broadcast server 16, in accordance with the present invention, can be a wired server connected to a network.

Figure 6:
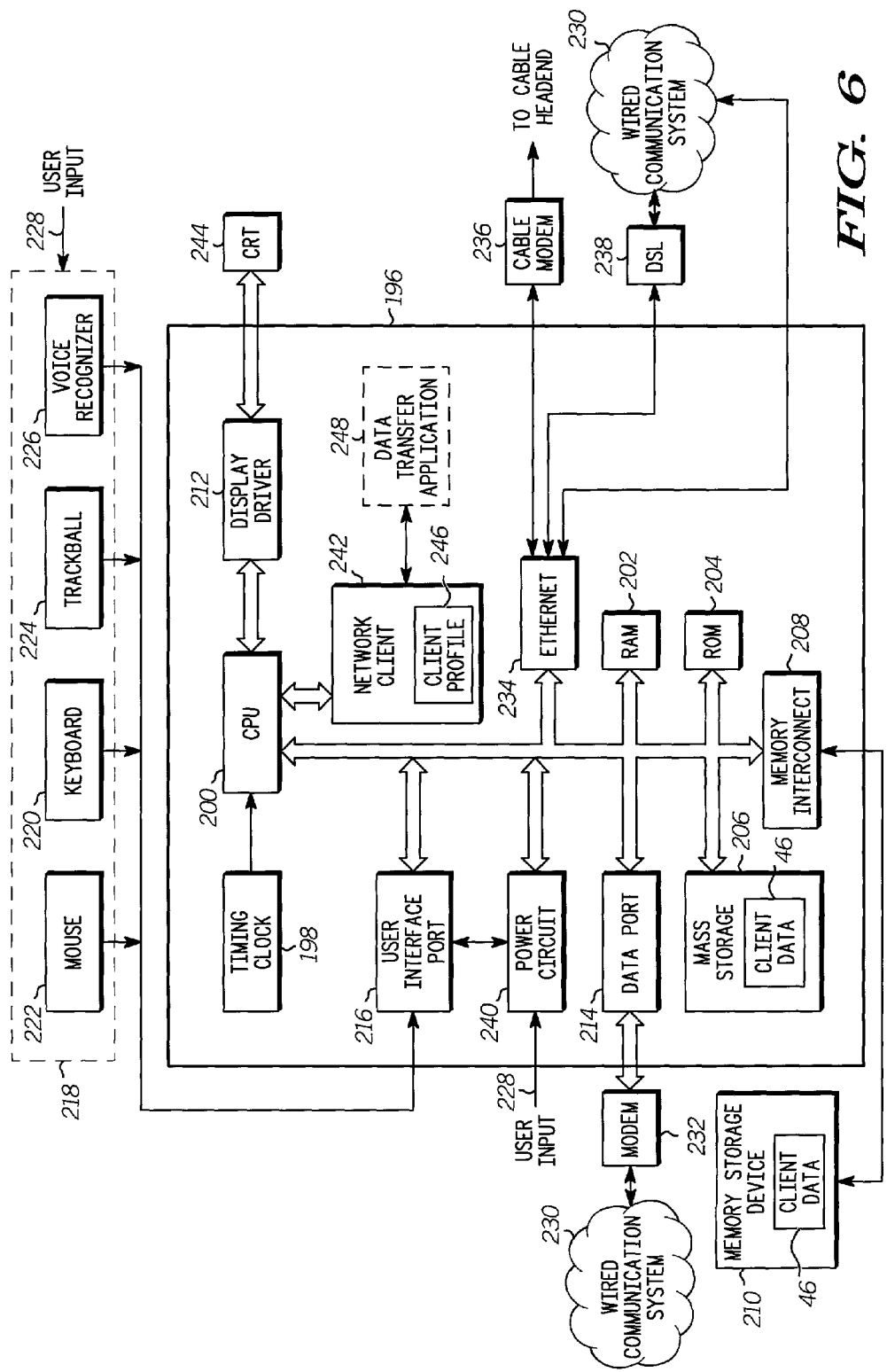
FIGS. 6 to 8 are electronic block diagrams of various embodiments of a device in which a client of FIG. 1 operates.

FIG. 6 is an electronic block diagram of one embodiment of a device in which the client 22 operates. Specifically, FIG. 6 illustrates a network device 196. The network device 196 can operate for example on a local area network (LAN) or a wide area network (WAN) or a combination of both. The network device 196 can be one of a plurality of spatially co-located computers which are typically located within a room, building or campus of buildings and are sharing common resources and communicating with each other on a computer network in a manner well known to one of ordinary skill in the art. Typical resources shared are files on a file server, printers on a print server, and electronic message (email) services on an email server. The network device 196 can operate on a network that uses a physical network such as ARCNET, Ethernet, Token-ring, Local Talk or other network media to connect the computers, which represent wired network nodes into the network. The network device 196 can operate on a LAN that employs any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or between the devices and the shared resources. Further the network device 196 can operate on a WAN that uses a different physical network media such as X.25, Frame Relay, ISDN, Modem dial-up or other media to connect other computers or other local area networks. In the following description, the term "network device" includes any of the devices operating as described above or an equivalent.

As illustrated, the network device 196 comprises a timing clock 198, a central processing unit 200, an electronic memory preferably in the form of a random access memory (RAM) 202 and/or a read only memory (ROM) 204, and a mass storage element (e.g., a disk drive or the like) 206. In one embodiment, the network device 196 includes a memory interconnect 208 for operatively connecting a memory storage device 210 to the network device 196. The memory interconnect 208 can, for example, comprise a structure for physically engaging external contacts on the memory storage device 210 so that the memory storage device 210 is directly connected to the network device 196. It will be appreciated by one of ordinary skill in the art that the memory interconnect 208 can also be a wireless connection such as an infrared, Bluetooth or radio frequency interface. When the memory interconnect 208 is connected to the memory storage device 210, the network device 196 can access a plurality of memory information such as the plurality of client data 46 from the memory storage device 210.

The network device 196 further preferably comprises a display driver 212, a general I/O interface or data port 214, and a user interface port 216 that accommodates a user interface 218 including any number of input means for general information entry. In the preferred embodiment, the user interface 218, e.g., a keyboard 220, a "mouse," 222, a pen or puck activated tablet (not shown), a trackball 224, an audio activated command recognition processor 226, or the like, allows a device user to enter and manipulate information using a user input 228. After information is entered, it can be communicated to a wired communication system 230 via a conventional modem 232 or the like. Preferably, the network device 196 also includes an Ethernet connection 234 for communicating to the wired communication system 230 or for communicating through either a conventional cable modem 236 to a cable headend, or a (Digital Subscriber Line) DSL connection 238 to the wired communication system 230. The network device 196 can be changed from an active to an inactive state or from an inactive state to an active state through the user input 228 to a power circuit 240. The power circuit 240 can be operated manually via the user input 228 directly to the power circuit 240, the user input 228 to the user interface 218, or alternatively automatically via the programming of the CPU 200.

In a preferred embodiment of the present invention, the network device 196 of FIG. 6 includes a network client 242. It will be appreciated by one of ordinary skill in the art that the network client 242 can be the first client 18, the second client 20, or any other of the plurality of clients 12 of FIG. 1. The network device 196 performs various functions related to one or more broadcast events for which the network device 196 is monitoring or plans to monitor in the future within the network client 242 using the plurality of client data 46 stored in the electronic memory of the network device 196. The network client 242 can be hard coded or programmed into the network device 196 during manufacturing, can be programmed over-the-air upon customer subscription, or can be a downloadable application. It will be appreciated that other programming methods can be utilized for programming the network client 242 into the network device 196. It will be further appreciated by one of ordinary skill in the art that the network client 242 can be hardware circuitry within the network device 196.

Preferably the network client 242 automatically updates a CRT 244 when a new entry has been sent or received by sending a command to the display driver 212. For example, the CRT 244 can be updated continuously as an event is broadcast or can be updated periodically for slow updates to an event. The network client 242 uses the plurality of client data 46 stored in the electronic memory or stored in the memory storage device 210 to perform functions relating to the broadcast events being monitored or planning to be monitored. It will be appreciated by one of ordinary skill in the art that networked devices having software-programming capabilities can include client data that is specialized and personalized such as the plurality of user preferences 60 including display options and screens for each account user 42, or similarly can include particular preferences associated with each broadcast event 34 including the plurality of broadcast information 74. Alternatively, networked devices that do not include software-programming capabilities can include the plurality of client data 46 including the plurality of user preferences 60 that are standard, pre-defined display options and screens for the plurality of current broadcast events for which the network client 242 is monitoring or plans to monitor in the future.

The plurality of user preferences 60 of the plurality of client data 46 used by the network client 242 further includes various alert options. In one embodiment, the network client 242 notifies the CPU 200 to send a command to an alert circuit (not shown) when new broadcast event information is received and/or when the current time either equals an event start time, an event end time, or is within a predetermined event time period. In another embodiment, the network client 242 notifies the CPU 200 to send a command to the alert circuit when a broadcast information is to be deleted from the memory. Alternatively, no alert can be sent when new broadcast event information is received and stored in the memory. It will be appreciated by one of ordinary skill in the art that other alerting schemes are within the scope of the present invention. Further, the CPU 200 can send a command to the alert circuit in response to the user input 228 to the user interface 218 through to the user interface port 216, such as a device user depressing a button or series of buttons, or in response to receipt of a message, initiates an input signal to the network client 242. The network client 242, in response to the input signal, accesses the plurality of client data 46 stored in the electronic memory for use in operation of the network client 242.

Preferably, the network client 242 includes the client profile 246. The client profile 246 includes information regarding the capabilities and limitations of the network client 242 and also of the network device 196. For example, the client profile 246 can include indication of the media supported by the network client 242 (e.g. audio, video), indication of which features are supported by the network client 242, device type, device display, device battery life, device battery capacity, device processing power, and access to alternate networks. It will be appreciated by one of ordinary skill in the art that the client profile 246 can include any of those mentioned above in any combination or an equivalent. It will be appreciated by one of ordinary skill in the art that the client profile 246 can be the client profile for the network device 196 or the network client 242 that is stored within the plurality of transfer client profiles 58 of the client data 46 within one or more of the plurality of clients 12 for which the network device 196 is available as a transfer device.

In accordance with the present invention, the network client 242 includes software capability for transferring all or a portion of the plurality of client data 46 to one or more other clients for use by the other client to participate within one or more of the plurality of sessions 54 within one or more of the plurality of servers 14. The network client 242, in accordance with the present invention, further includes software capability for receiving all or a portion of the plurality of client data 46 from at least one other client to transfer the monitoring of one or more of the plurality of broadcast events 14. As illustrated in FIG. 6, the software capability for transferring and/or the capability for receiving the plurality of client data 46 can be incorporated into the network client 242, or alternatively can be contained within a separate data transfer application 248. The data transfer application 248, for example can be a third party software add-on that is compatible with existing client software applications (e.g. the network client 242) already programmed into the network device 196. Maintaining the data transfer software on a separate data transfer application 248 minimizes incorporation timeframes and also the cost of upgrading the network device 196 to include this feature.

Figure 7:
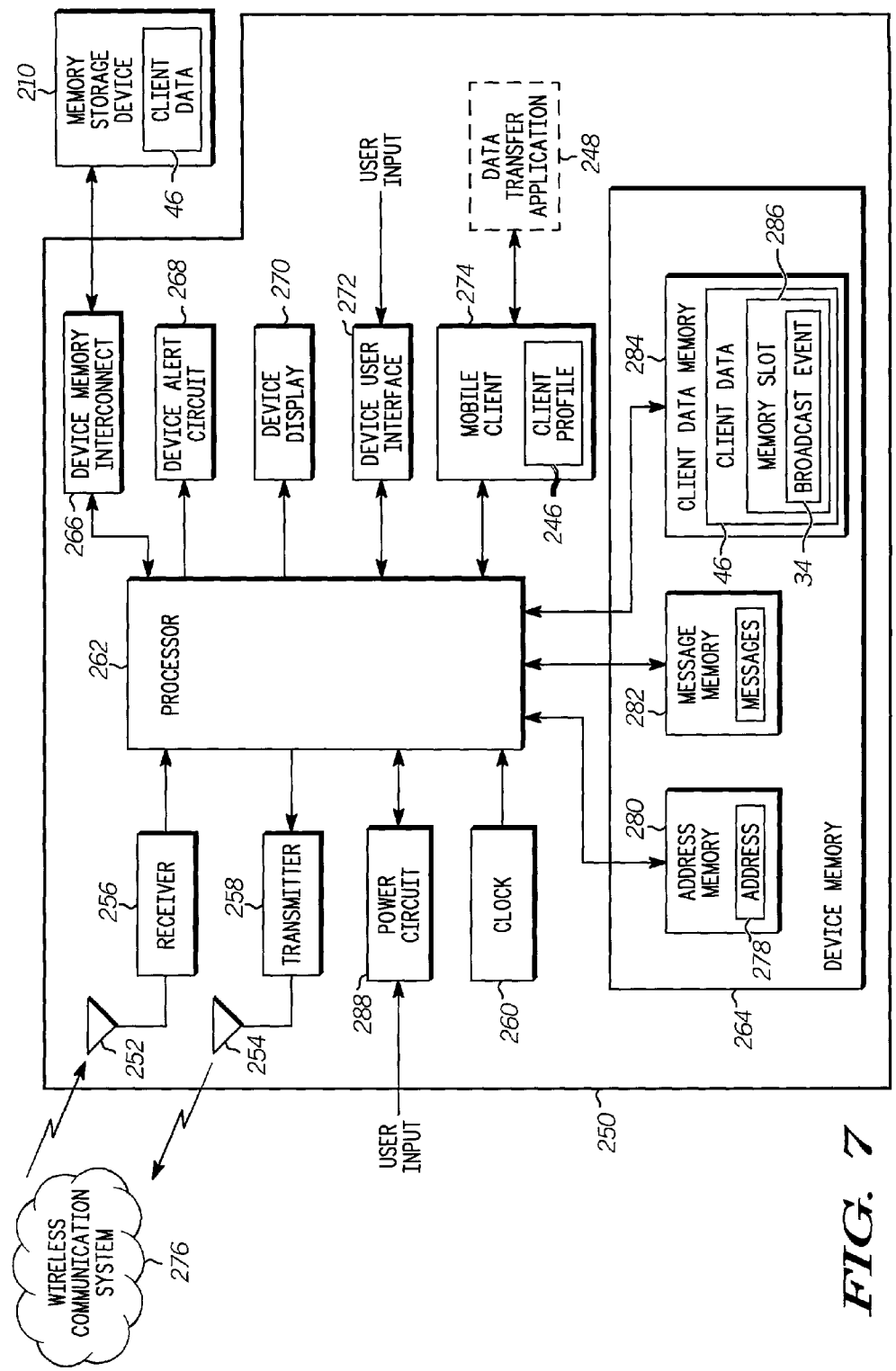

FIG. 7 is an electronic block diagram of one embodiment of a device in which the client 22 operates. Specifically, FIG. 7 illustrates a mobile device 250. It will be appreciated by one of ordinary skill in the art that the mobile device 250 in accordance with the present invention, can be a mobile cellular telephone, a mobile radio data terminal, a mobile cellular telephone having an attached data terminal, or a two way pager, such as the "Page Writer 2000X" manufactured by Motorola Inc. of Schaumburg, Ill. In the following description, the term "mobile device" refers to any of the devices mentioned above or an equivalent.

As illustrated in FIG. 7, the mobile device 250 includes a first antenna 252, a second antenna 254, a receiver 256, a transmitter 258, a clock 260, a processor 262, a device memory 264, a device memory interconnect 266, a device alert circuit 268, a device display 270, a device user interface 272 and a mobile client 274.

The first antenna 252 intercepts transmitted signals from a wireless communication system 276. It will be appreciated by one of ordinary skill in the art that the wireless communication system 276, in accordance with the present invention, can function utilizing any wireless radio frequency (RF) channel, for example, a one or two-way pager channel, a mobile cellular telephone channel, or a mobile radio channel. Similarly, it will be appreciated by one of ordinary skill in the art that the wireless communication system 276 can function utilizing other types of communication channels such as infrared channels. In the following description, the term "wireless communication system" refers to any of the wireless communication systems mentioned above or an equivalent.

The first antenna 252 is coupled to the receiver 256, which employs conventional demodulation techniques for receiving the communication signals transmitted by the wireless communication system 276. Coupled to the receiver 256, is the processor 262 utilizing conventional signal-processing techniques for processing received messages. Preferably, the processor 262 is similar to the MC68328 micro-controller manufactured by Motorola, Inc. of Schaumburg, Ill. It will be appreciated by one of ordinary skill in the art that other similar processors can be utilized for the processor 262, and that additional processors of the same or alternative type can be utilized as required to handle the processing requirements of the processor 262. The processor 262 decodes an address in the demodulated data of the received message, compares the decoded address with one or more addresses 278 stored in an address memory 280 of the device memory 264; and when a match is detected, proceeds to process the remaining portion of the received message.

To perform the necessary functions of the mobile device 250, the processor 262 is coupled to the device memory 264, which preferably includes a random access memory (RAM), a read-only memory (ROM), and an electrically erasable programmable read-only memory (EEPROM)(not shown). The device memory 264 includes the address memory 280, a message memory 282, and a client data memory 284.

Once the processor 262 has processed a received message, it stores the decoded message in the message memory 282 of the device memory 278. It will be appreciated by one of ordinary skill in the art that the message memory 282, in accordance with the present invention, can be a voicemail box or a group of memory locations in a data storage device. In the following description, the term "message memory" refers to any of the memory means mentioned above or an equivalent. Preferably, when the received message is a message associated with a broadcast event, the processor 262 stores the decoded message in the client data memory 284. For example, the message to be stored in the client data memory 284 can include one or more of the plurality of broadcast information 74 for the broadcast event 34 such as the event identification 96, the monitoring license 98, the event time period 100, the broadcast channel 102, the connection information 104, and/or the media information 106. Similarly, the message can be a monitoring notification informing the mobile device 250 to monitor the broadcast event 34. It will be appreciated by one of ordinary skill in the art that the monitoring notification can include any of the plurality of broadcast information 74 or an equivalent.

In one embodiment, the mobile device 250 includes the device memory interconnect 266 for operatively connecting the memory storage device 210 to the mobile device 250. The device memory interconnect 266 can, for example, comprise a structure for physically engaging external contacts on the memory storage device 210 so that the memory storage device 210 is directly connected to the mobile device 250. It will be appreciated by one of ordinary skill in the art that the device memory interconnect 266 can also be a wireless connection such as an infrared, Bluetooth or radio frequency interface. When the device memory interconnect 266 is connected to the memory storage device 210, the mobile device 250 can access a plurality of memory information such as the plurality of client data 46 from the memory storage device 210.

Figure 8:
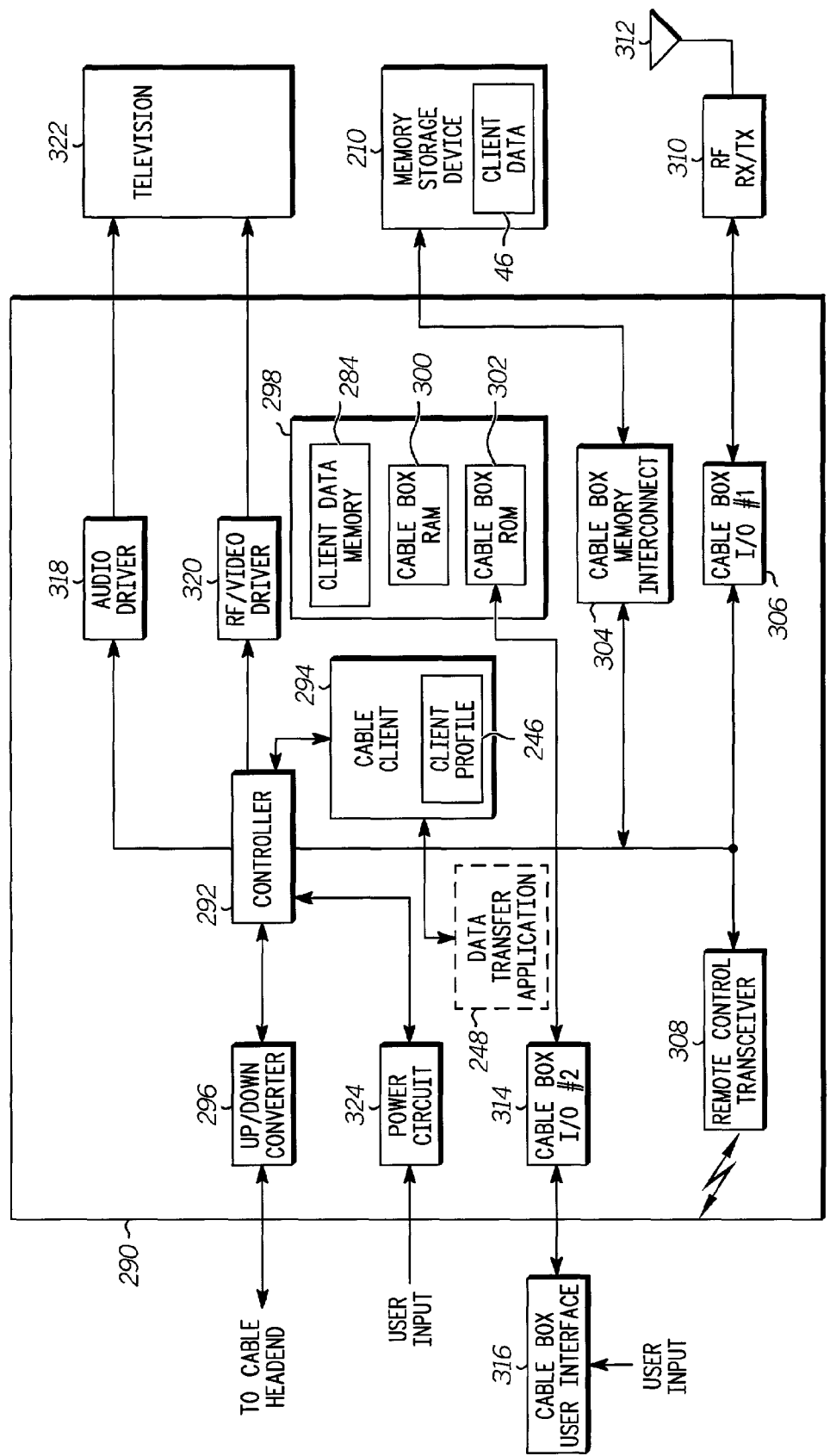

The client data memory 284 includes the plurality of client data 46 as described previously in FIG. 2. The client data memory 284 includes a memory slot 286 for each broadcast event 34 in which the mobile device 250 is monitoring. The memory slot 286, in accordance with the present invention, preferably includes the plurality of broadcast information 74 as illustrated in FIG. 4. The memory slot 286 is preferably allocated a fixed amount of memory for storing associated broadcast information for each broadcast event. It will be appreciated by one of ordinary skill in the art that, in accordance with the present invention, the client data memory 284 and associated operation herein described, in accordance with the present invention, can be included in the network device 196 of FIG. 6, a cable box 290 as illustrated in FIG. 8, or any other device in which the client 22 operates.

Upon receipt and processing of a message, the processor 262 preferably generates a command signal to the device alert circuit 268 as a notification that the message has been received and stored. The device alert circuit 268 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the device alert circuit 268.

Upon receipt and processing of a message, the processor 262 preferably also generates a command signal to the device display 270 to generate a visual notification of the receipt and storage of the message. When the device display 270 receives the command signal from the processor 262 that the message has been received and stored in the device memory 264, a message indication is displayed. The message indication, for example can be the activation of one of a plurality of message icons on the device display 270. The device display 270 can be, for example, a liquid crystal display utilized to display text. It will be appreciated by one of ordinary skill in the art that other similar displays such as cathode ray tube displays can be utilized for the device display 270.

The mobile device 250 preferably further includes the clock 260. The clock 260 provides timing for the processor 262. The clock 260 can include the current time for use in the operation of the mobile device 250. The clock 260 also provides a source for timing of feature enhancements such as active and inactive periods of operation or periods of alerting.

In a preferred embodiment, the mobile device 250 includes the mobile client 274. It will be appreciated by one of ordinary skill in the art that the mobile client 274 can be the first client 18, the second client 20, or any other of the plurality of clients 12 of FIG. 1. The mobile client 274 performs operation functions within the mobile device 250 using the plurality of client data 46 stored in the client data memory 284. The mobile client 274 can be hard coded or programmed into the mobile device 250 during manufacturing, can be programmed over-the-air upon customer subscription, or can be a downloadable application. It will be appreciated that other programming methods can be utilized for programming the mobile client 274 into the mobile device 250. It will be further appreciated by one of ordinary skill in the art that the mobile client 274 can be hardware circuitry within the mobile device 250. Preferably the mobile client 274 automatically updates the device display 270 when a new entry has been sent or received. For example, the device display 270 can be updated continuously as an event is broadcast or can be updated periodically for slow updates to an event. The mobile client 274 uses the plurality of client data 46 stored in the electronic memory or stored in the memory storage device 210 to perform functions relating to various received and/or sent entries relating to broadcast events being monitored or planning to be monitored. It will be appreciated by one of ordinary skill in the art that mobile devices having software-programming capabilities can include specialized and personalized display options and screens for each broadcast event 34. Alternatively, mobile devices that do not include software-programming capabilities can include standard, pre-defined display options and screens for the plurality of broadcast events 14. In accordance with the present invention, the display options for the plurality of broadcast events in which the mobile client 274 within the mobile device 250 is participating can be included in the plurality of user preferences for each broadcast event 34 or alternatively, the display options can be stored independently within the plurality of user preferences 60 of the plurality of client data 46.

The mobile client 274 further operates using various alert options. In one embodiment, the mobile client 274 notifies the processor 262 to send a command to the device alert circuit 268 when new broadcast information is added to the memory slot 286 of the client data memory 284 for the broadcast event 34 or when the current time is an event start time, an event end time, or within a predetermined event time period. In another embodiment, the mobile client 274 notifies the processor 262 to send a command to the device alert circuit 268 when any of the broadcast information is to be deleted from the memory slot 286. Alternatively, no alert can be sent when a new entry is received and stored in the client data memory 284 and/or when the current time is an event start time. It will be appreciated by one of ordinary skill in the art that other alerting schemes are within the scope of the present invention. In accordance with the present invention, the alert options for the plurality of current broadcast events 62 in which the mobile client 274 within the mobile device 250 is monitoring can be included in the plurality of user preferences for each broadcast event 34 or alternately, the alert options can be stored independently within the plurality of user preferences 60 of the plurality of client data 46.

In accordance with the present invention, the mobile client 274 includes software capability for transferring all or a portion of the plurality of client data 46 to at least one other client for use by the other client to monitor one or more of the plurality of current broadcast events s 62. The mobile client 274, in accordance with the present invention, further includes software capability for receiving all or a portion of the plurality of client data 46 from another client to monitor one or more of the plurality of broadcast events s 14. As illustrated in FIG. 7, the software capability for transferring and receiving client data can be incorporated into the mobile client 274 (not shown) or alternatively contained within a separate data transfer application 248. The data transfer application 248, for example can be a third party software add-on that is compatible with existing software applications (e.g. the mobile client 274) already programmed into the mobile device 250. Maintaining the data transfer software on a separate data transfer application 248 minimizes incorporation timeframes and also the cost of upgrading a mobile device to include this feature.

Preferably, the device user interface 272 is coupled to the processor 262. The device user interface 272 can be one or more buttons used to generate a button press, a series of button presses, a voice response from the device user, or some other similar method of manual response initiated by the device user (such as the account user 64) of the mobile device 250. The processor 262, in response to the device user interface 272, such as a device user depressing a button or series of buttons, or in response to receipt of a message, initiates an input signal to the mobile client 274. The mobile client 272, in response to the user input signal, accesses the plurality of client data 46 in the client data memory 284 for use in operation of the mobile client 274.

Preferably, the mobile client 274 includes the client profile 246. The client profile 246 includes information regarding the capabilities and limitations of the mobile client 274 and also of the mobile device 250. For example, the client profile 246 can include indication of the media supported by the mobile client 274 (e.g. audio, video), indication of which features are supported by the mobile client 274, device type, device protocol usage, device display, device battery life, device battery capacity, device processing power, and access to alternate networks. It will be appreciated by one of ordinary skill in the art that the client profile 246 can include any of those mentioned above in any combination or an equivalent. It will be appreciated by one of ordinary skill in the art that the client profile 246 can be the client profile for the mobile device 250 or the mobile client 274 that is stored within the plurality of transfer client profiles 58 of the client data 46 within one or more of the plurality of clients 12 for which the mobile device 250 is available as a transfer device. The transmitter 258 is coupled to the processor 262 and is responsive to commands from the processor 262. When the transmitter 258 receives a command from the processor 262, the transmitter 258 sends a signal via the second antenna 254 to the wireless communication system 276.

In an alternative embodiment (not shown), the mobile device 250 includes one antenna performing the functionality of the first antenna 252 and the second antenna 254. Further, the mobile device 250 alternatively includes a transceiver circuit performing the functionality of the receiver 256 and the transmitter 258. It will be appreciated by one of ordinary skill in the art that other similar electronic block diagrams of the same or alternate type can be utilized for the mobile device 250 to handle the requirements of the mobile device 250.

The mobile device 250 can be changed from an active state to an inactive state or from an inactive state to an active state through a user input to a power circuit 288. The power circuit 288 can be operated manually via the user input to the power circuit 288, the user input to the device user interface 272, or alternatively automatically via the programming of the processor 262.

FIG. 8 is an electronic block diagram of one embodiment of a device in which the client 22 operates. Specifically, FIG. 8 illustrates an interactive broadcast receiver such as a cable box 290. The cable box 290 preferably allows network operators to deploy a wide range of interactive television broadcast services and applications on their networks. Further the cable box 290 preferably offers cable operators a combined, all-in-one, hardware and software solution for deploying interactive television services on their networks, thereby creating the ability for real time electronic message communication using television sets and networks.

As illustrated in FIG. 8, the cable box 290 preferably includes a controller 292 for controlling the operation of the cable box 290. Preferably, the controller 292 is similar to the MC68328 micro-controller manufactured by Motorola, Inc. of Schaumburg, Ill. It will be appreciated by one of ordinary skill in the art that other similar processors can be utilized for the controller 292, and that additional processors of the same or alternative type can be utilized as required to handle the processing requirements of the controller 292. Preferably, the controller 292 is programmed to function with a cable client 294. The cable client 294, in accordance with the present invention, operates similarly to the network client 242 of FIG. 6 and the mobile client 274 of FIG. 7 as described above. It will be appreciated by one of ordinary skill in the art that the cable client 294 illustrated in FIG. 8 can be the first client 18, the second client 20, or any other of the plurality of clients 12 of FIG. 1.

In accordance with the present invention, the cable client 294 includes software capability for transferring all or a portion of the plurality of client data 46 to at least one other client for use by the other client to monitor one or more of the plurality of broadcast events s 14. The cable client 294 further includes software capability for receiving all or a portion of the plurality of client data 46 from another client to monitor one or more of the plurality of broadcast events s 14. As illustrated in FIG. 8, the software capability for transferring and receiving client data can be incorporated into the cable client 294 (not shown) or alternatively contained within a separate data transfer application 248. The data transfer application 248, for example can be a third party software add-on that is compatible with existing software applications (e.g. the cable client 294) already programmed into the cable box 290. Maintaining the data transfer software on a separate data transfer application 248 minimizes incorporation timeframes and also the cost of upgrading a device to include this feature.

Preferably, the cable client 294 includes the client profile 246. The client profile 246 includes information regarding the capabilities and limitations of the cable client 294 and of the cable box 290. For example, the client profile 246 can include indication of the media supported by the cable client 294 (e.g. audio, video), indication of which features are supported by the cable client 294, device type, device protocol usage, device display, device battery life, device battery capacity, device processing power, and access to alternate networks. It will be appreciated by one of ordinary skill in the art that the client profile 246 can include any of those mentioned above in any combination or an equivalent. It will be appreciated by one of ordinary skill in the art that the client profile 246 can be the client profile for the cable box 290 or the cable client 294 that is stored within the plurality of transfer client profiles 58 of the client data 46 within one or more of the plurality of clients 12 for which the cable box 290 is available as a transfer device.

The cable box 290 further includes an up/down converter 296 coupled to the controller 292 for communicating with a cable headend. To perform the necessary functions of the cable box 290, the controller 292 is further coupled to a cable box memory 298, which preferably includes a cable box random access memory (RAM) 300, a cable box read-only memory (ROM) 302, and an electrically erasable programmable read-only memory (EEPROM)(not shown). The cable box memory 298 of the cable box 290 preferably includes the client data memory 284 as previously described and illustrated in FIG. 7.

In one embodiment, the cable box 290 includes a cable box memory interconnect 304 for operatively connecting the memory storage device 210 to the cable box 290. The cable box memory interconnect 304 can, for example, comprise a structure for physically engaging external contacts on the memory storage device 210 so that the memory storage device 210 is directly connected to the cable box 290. It will be appreciated by one of ordinary skill in the art that the cable box memory interconnect 304 can also be a wireless connection such as an infrared, Bluetooth or radio frequency interface. When cable box memory interconnect 304 is connected to the memory storage device 210, the cable box 290 can access a plurality of memory information such as the plurality of client data 46 from the memory storage device 210.

Further coupled to the controller 292 is a first cable box I/O 306 for driving a remote control transceiver 308 and further for driving a radio frequency transceiver 310 connected to a cable box antenna 312. A second cable box I/O 314 for inputs from a user input via a cable box user interface 316 is further coupled to the controller 292. Also coupled to the controller 292 are an audio driver 318 and a radio frequency/video driver 320 for communicating with a television 322.

The cable box 290 can be changed from an active state to an inactive state or from an inactive state to an active state through a user input to a cable box power circuit 324. The cable box power circuit 324 can be operated manually via the user input to the cable box power circuit 324, the user input to the cable box user interface 316 or alternatively automatically via the programming of the controller 292.

Figure 9:
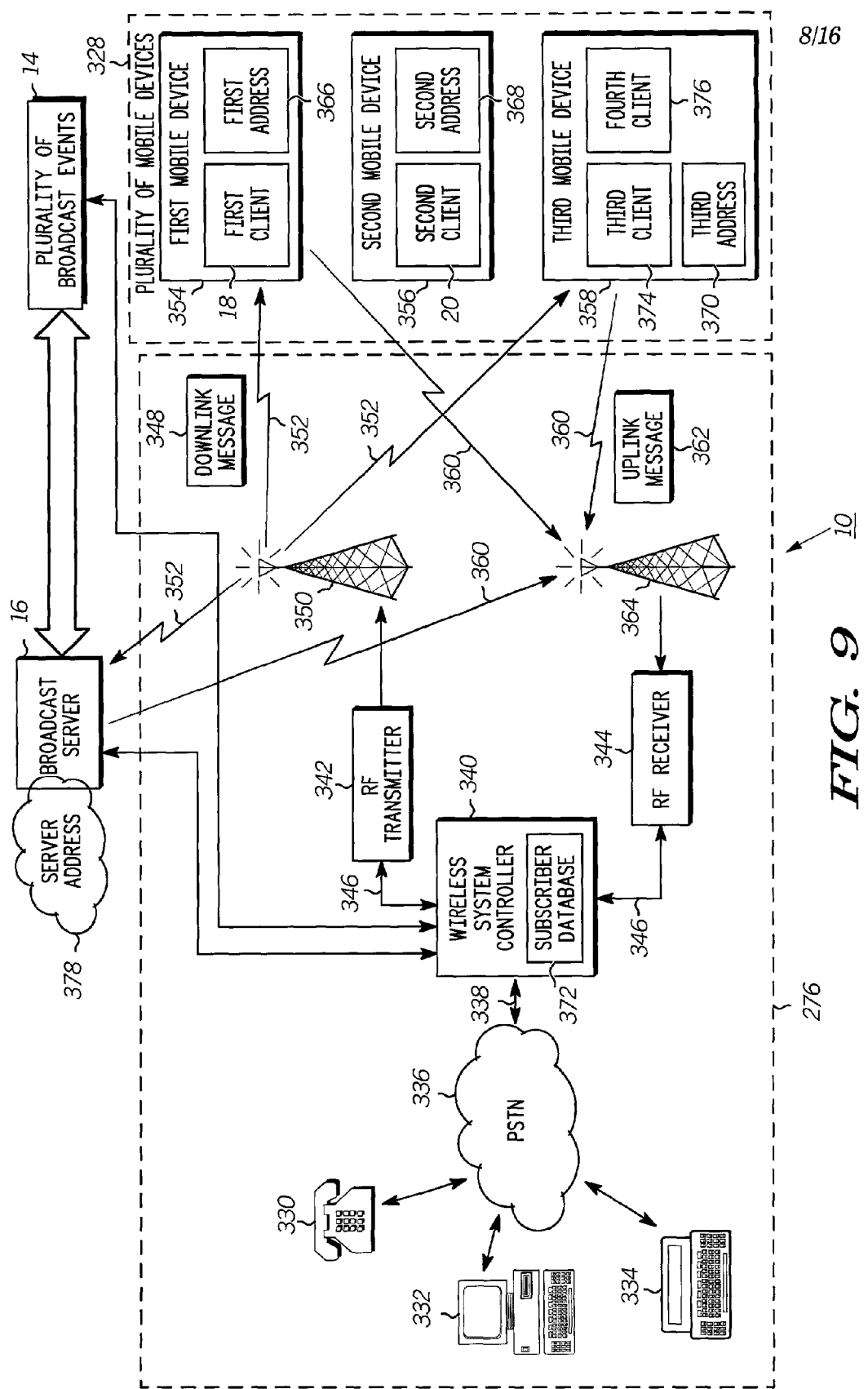
FIGS. 9 to 12 are electronic block diagrams of various embodiments of the communication system of FIG. 1, in accordance with the preferred embodiment of the present invention.

FIG. 9 is an electronic block diagram of one embodiment of the communication system 10 of FIG. 1. Specifically, the communication system 10 as illustrated in FIG. 9 includes, the broadcast server 16, the plurality of broadcast events 14, the plurality of clients 12 within a plurality of mobile devices 328, and the wireless communication system 276.

The wireless communication system 276, as illustrated in FIG. 9 includes a message input device for initiating messages into the wireless communication system 276. The message input device can be, for example, a telephone 330, a computer 332, a desktop messaging unit 334, or the broadcast server 16 connected through a conventional public switched telephone network (PSTN) 336 through a plurality of telephone links 338 to a wireless system controller 340. The telephone links 338, for example, can be a plurality of twisted wire pairs, a fiber optic cable, or a multiplexed trunk line.

The wireless system controller 340 is coupled to and oversees the operation of at least one radio frequency (RF) transmitter 342 and at least one radio frequency (RF) receiver 344 through one or more communication links 346. The communication links 346 typically are twisted pair telephone wires, and additionally can include radio frequency (RF), microwave, or other communication links. The RF transmitter 342 and the RF receiver 344 typically are used with message store and forward stations that encode and decode inbound and outbound messages into formats that are compatible with landline message switched computers and personal radio addressing requirements, such as cellular messages, short messaging service, or paging protocols. The wireless system controller 340 can also function to encode and decode wireless messages that are transmitted to or received by the RF transmitter 342 or the RF receiver 344. Telephony signals are typically transmitted to and received from the wireless system controller 340 by telephone sets such as the telephone 330 or a mobile device. The wireless system controller 340 encodes and schedules outbound messages such as a downlink message 348. The wireless system controller 340 then transmits the encoded outbound messages through the RF transmitter 342 via a transmit antenna 350 to the plurality of mobile devices 328 such as the mobile device 250 of FIG. 7 (or alternatively to the broadcast server 16 or directly to the plurality of broadcast events 14) on at least one outbound radio frequency (RF) channel 352. The plurality of mobile devices 328, for example, includes a first mobile device 354, a second mobile device 356, and a third mobile device 358 each communicating through a wireless connection such as the outbound RF channel 352 and an inbound RF channel 360. The downlink message 348 can be, for example, the plurality of client data 46, a monitoring notification, the plurality of broadcast information 74, or any other of similar data. Similarly, the wireless system controller 340 receives and decodes inbound messages such as an uplink message 362 received by the RF receiver 344 via a receive antenna 364 on at least one inbound radio frequency (RF) channel 360 from one of the plurality of mobile devices 328 (or alternatively from the broadcast server 16 or from the plurality of broadcast events 14). The uplink message 362 can be, for example, the plurality of client data 46, a monitoring notification, the plurality of broadcast information 74, or any other of similar data.

Each of the plurality of mobile devices 328 assigned for use within the wireless communication system 276 has an address or identity assigned thereto which is a unique selective call address in the wireless communication system 276. For example, the first mobile device 354 has a first address 366, the second mobile device 356 has a second address 368, and the third mobile device 358 has a third address 370. It will be appreciated by one of ordinary skill in the art that other mobile devices assigned for use with the wireless communication system 276 have an address assigned thereto which is a unique selective call address in the wireless communication system 276. The address enables the transmission of the downlink message 348 from the wireless system controller 340 only to the mobile device having the address, and identifies the messages and responses received at the wireless system controller 340 from the mobile device with the address. In one embodiment, each of the plurality of mobile devices 328 also has a pin number assigned thereto, the pin number being associated with a telephone number within the PSTN 336. A list of the assigned addresses and correlated telephone numbers for each of the plurality of mobile devices 328 is stored in the wireless system controller 340 in the form of a subscriber database 372.

Preferably, at least one client operates within a mobile device. For example, as illustrated in FIG. 9, the first client 18 operates within the first mobile device 354 and the second client 20 operates within the second mobile device 356. Similarly, a plurality of clients can operate within the same mobile device. For example, a third client 374 and a fourth client 376 operate within the third mobile device 358. It will be appreciated by one of ordinary skill in the art that, in accordance with the present invention, a mobile device can include no client, one client, or a plurality of clients.

In one embodiment of the present invention, the broadcast server 16 is coupled to the wireless system controller 340 of the wireless communication system 276. The broadcast server 16 provides a means for electronic monitoring by the plurality of mobile devices 328 of the plurality of broadcast events 14. The broadcast server 16, for example, receives a request and can in response to such receipt, sends a response, both via the wireless system controller 340. The wireless system controller 340 then routes the response to the requesting device which can be a message input device, such as the telephone 330, the computer 332, or the desktop messaging unit 334, or alternatively can be an individual or one of the plurality of mobile devices 328. In the following description, the term "requester" refers to any of the requesting devices mentioned above or an equivalent.

Preferably, the broadcast server 16 includes a server address 378, which is a unique selective call address in the wireless communication system 276. The server address 378 enables the transmission, via the inbound RF channel 360, to the broadcast server 16 of various electronic communications. The broadcast server 16 similarly sends electronic communications to the plurality of mobile devices 328 via the outbound RF channel 352. Furthermore, the broadcast server 16 can also have a PIN number assigned thereto, the PIN number being associated with a telephone number within the PSTN 336. The server address 378 and correlated telephone number is stored in the in the subscriber database 372 of the wireless system controller 340.

The coupling of the broadcast server 16 to the wireless communication system 276 enhances the operation of the communication system 10 by adding intelligence for multiple mobile devices to receive and transfer multiple broadcast events. The broadcast server 16 interactively manages the messaging traffic associated with monitoring of multiple broadcast events s in an efficient manner. For example, the first client 18 can send a request for a plurality of broadcast information associated with at least one broadcast event to the broadcast server 16 and in response, the broadcast server 16 can send the plurality of broadcast information 74 to the second client 20. Alternatively, the broadcast server 16 can send the plurality of broadcast information 74 to the first client 18; and the first client 18 can then send the received plurality of broadcast information 74 to the second client 20.

Once the second client 20 receives the plurality of broadcast information 74, it will be capable of using the plurality of broadcast information 74 to monitor one or more of the plurality of broadcast events 14. The information used to monitor one or more of the plurality of broadcast events (e.g. the text messages, images, audio, and/or video) can be sent to the second client 20 via the broadcast server 16 or by bypassing the broadcast server 16 and sending the monitoring information directly from one or more of the plurality of broadcast events 14 through the wireless system controller 340 and to the second client 20.

Figure 10:
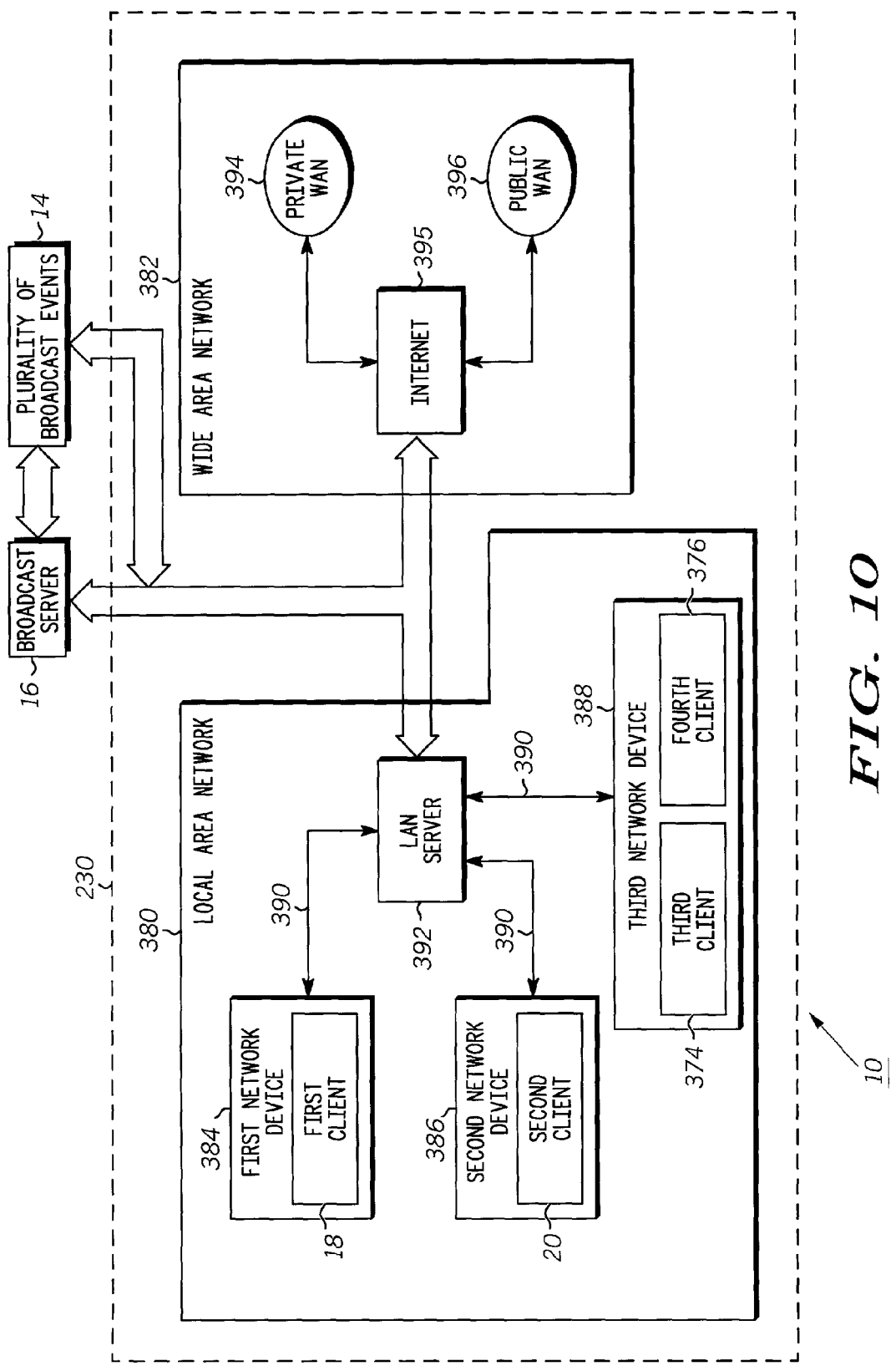

FIG. 10 is an electronic block diagram of one embodiment of the communication system of FIG. 1. Specifically, FIG. 10 illustrates an embodiment of the present invention in which the communication system 10 includes the wired communication system 230 of FIG. 6, the broadcast server 16, and the plurality of broadcast events 14. The wired communication system 230, for example, can include a LAN 380 (local area network), a WAN 382 (wide area network), or a combination of LAN 380 and WAN 382 networks. It will be appreciated that while only a single LAN 380 and a single WAN 382 are shown, multiple LAN 380 networks and/or WAN 382 networks can be interconnected in a manner well known to one of ordinary skill in the art for the transfer of electronic communication such as the plurality of client data 46.

The general function and operation of the LAN 380 is one of allowing spatially co-located computers which are typically located within a room, building or campus of buildings to communicate with each other and/or share common resources on a computer network in a manner well known to one of ordinary skill in the art. The spatially co-located computers are represented pictorially in FIG. 10 as a plurality of network devices, such as the network device 196 of FIG. 6, three of which are shown by example. (a first network device 384, a second network device 386, and a third network device 388) Each of the plurality of network devices communicates using a network connection 390. Preferably, at least one client operates within a network device. For example, as illustrated in FIG. 10, the first client 18 operates within the first network device 384 and the second client 20 operates within the second network device 386. Similarly, a plurality of clients can operate within the same network device. For example, the third client 374 and the fourth client 376 operate within the third network device 388. It will be appreciated by one of ordinary skill in the art that, in accordance with the present invention, a network device can include no client, one client, or a plurality of clients.

Typical resources shared on the LAN 380 through a LAN server 392 are files on a file server, printers on a print server, electronic message (email) services on an email server, and Internet connection services on an Internet server. The LAN 380 uses a physical network such as ARCNET, Ethernet, Token-ring, Local Talk or other network media to connect the computers, which represent wired network nodes into the network. The LAN 380 can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication between clients and the server. In the following description, the term "local area network" refers to a network utilizing any of the networking protocols mentioned above or an equivalent. The LAN 380 can also use routers (not shown) to subnet the LAN 380 organizationally or physically. In this context, the definition of the LAN 380 as described herein refers to a geographic locality of computers and the type of wired media used to interconnect the computers for communication.

The general function and operation of the WAN 382 is also one of allowing computers to share common resources. However, in this context the definition used herein is one where the computers are not spatially co-located. The typical resources shared are similar to, if not the same, as found in the LAN 380. However, the WAN 382 uses a different physical network media such as X.25, Frame Relay, ISDN, Modem dial-up or other media to connect other computers or other local area networks to the WAN 382 network. The WAN 382, for example, can include a number of well-known private wide area networks, one (394) of which is shown by example; and public wide area networks, one (396) of which is show by example, such as CompuServe™, America Online™ (AOL), the MIT computer network, the Motorola™ computer network and Prodigy™. In the following description, the term "wide area network" refers to any of the networks mentioned above or an equivalent. The WAN 382 described above can operate independently, or can be interconnected through the Internet computer network 395. Likewise, the LAN 380 can also be interconnected to the WAN 382 through the Internet computer network 395, as shown, in a manner well known to one of ordinary skill in the art.

In one embodiment of the present invention, the broadcast server 16 is coupled to the LAN 380 and the WAN 382. The broadcast server 16 provides a means for electronic monitoring by the plurality of network devices of the plurality of broadcast events 14. The broadcast server 16, for example, receives a request and can in response to such receipt, sends a response. The coupling of the broadcast server 16 to the wireless communication system 276 enhances the operation of the communication system 10 by adding intelligence for multiple networked devices to receive and transfer multiple broadcast events of the plurality of broadcast events 14. The broadcast server 16 interactively manages the messaging traffic associated with monitoring of multiple broadcast events in an efficient manner. For example, the first client 18 can send a request for a plurality of broadcast information associated with at least one broadcast event of the plurality of broadcast events 14 to the broadcast server 16 and in response, the broadcast server 16 can send the plurality of broadcast information 74 to the second client 20. Alternatively, the broadcast server 16 can send the plurality of broadcast information 74 to the first client 18; and the first client 18 can then send the received plurality of broadcast information 74 to the second client 20. It will be appreciated by one of ordinary skill in the art that, in accordance with the present invention, the plurality of broadcast events 14 can be connected directly to the LAN 380 and the WAN 382.

Once the second client 20 receives the plurality of broadcast information 74, it will be capable of using the plurality of broadcast information 74 to monitor one or more of the plurality of broadcast events 14. The information used to monitor one or more of the plurality of broadcast events (e.g. the text messages, images, audio, and/or video) can be sent to the second client 20 via the broadcast server 326 or by bypassing the broadcast server 326 and sending the monitoring information directly from one or more of the plurality of broadcast events 14 through the LAN server 392 and to the second client 20.

Figure 11:
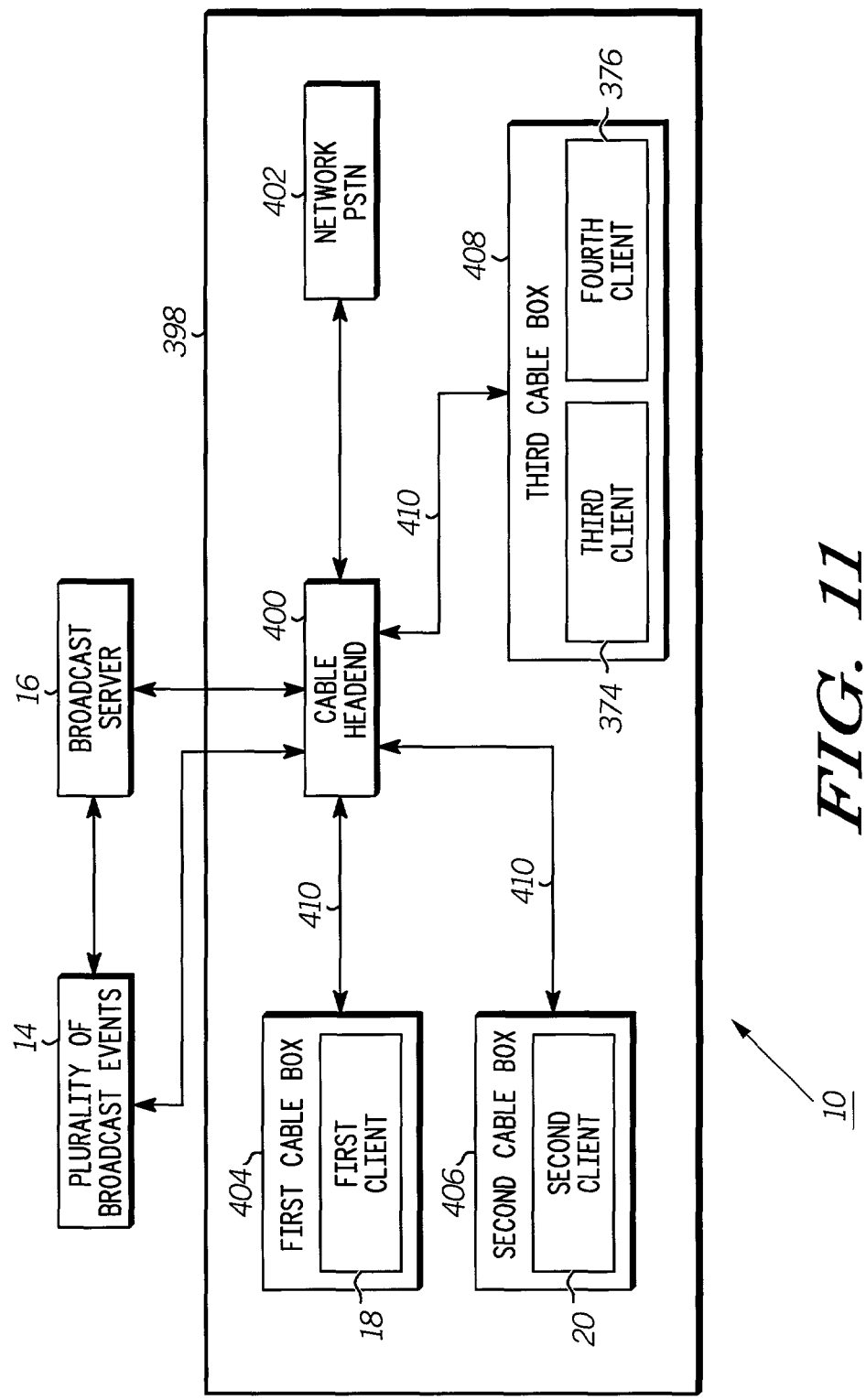

FIG. 11 is an electronic block diagram of one embodiment of the communication system 10 of FIG. 1. Specifically, FIG. 11 illustrates an alternate embodiment of the present invention in which the communication system 10 includes a broadcast communication system 398, the broadcast server 16, and the plurality of broadcast events 14.

The broadcast communication system 398 preferably includes a cable headend 400, a network PSTN 402, and a plurality of cable boxes, such as the cable box 290 of FIG. 8, three of which are shown by way of example (a first cable box 404, a second cable box 406, and a third cable box 408). Each of the plurality of cable boxes communicates within the broadcast communication system 398 via a wired connection 410. Preferably, at least one client operates within a cable box. For example, as illustrated in FIG. 11, the first client 18 operates within the first cable box 404 and the second client 20 operates within the second cable box 406. Similarly, a plurality of clients can operate within the same cable box. For example, the third client 374 and the fourth client 376 operate within the third cable box 408. It will be appreciated by one of ordinary skill in the art that, in accordance with the present invention, a cable box can include no client, one client, or a plurality of clients.

The cable headend 400 is coupled to the first cable box 404, the second cable box 406, the third cable box 408, the network PSTN 402, and, in one embodiment, the broadcast server 16 (or alternatively the plurality of broadcast events 14). The cable headend 400 enables operators to deliver services such as conventional video and audio broadcasting, near video on demand (NVOD), video on demand (VOD), pay television, advertising, information, interactive shopping and more. The cable headend 400 preferably offer functions such as MPEG-2/DVB (Moving Picture Experts Group—2/Digital Video Broadcasting) encoding of local and non-compressed programs, insertion of local advertising and events data insertion, conditional access (CA) scrambling, interactive services, and monitoring and control of the entire network. At the multiplexing stage, broadcasters can create program bouquets and add PSI/SI information (Program Specific Information (PSI)/specific information (SI)) before the outgoing transport stream is delivered to a conditional access (CA) system for scrambling. Following processing, transport streams are modulated and then transmitted to the cable headend 400 via telecom networks, terrestrial or satellite systems.

In one embodiment of the present invention, the broadcast server 16 is coupled to the cable headend 400 of the broadcast communication system 398. The coupling of the cable headend 400 to the broadcast server 16 provides a means for electronic monitoring by the cable boxes of the plurality of broadcast events 14. It will be appreciated by one of ordinary skill in the art that, in accordance with the present invention, the plurality of broadcast events 14 can be connected directly to the cable headend 400. The coupling of the cable headend 400 to the plurality of broadcast events 14 provides a means for electronic monitoring by the cable boxes of the plurality of broadcast events 14 bypassing the broadcast server 16.

Figure 12:
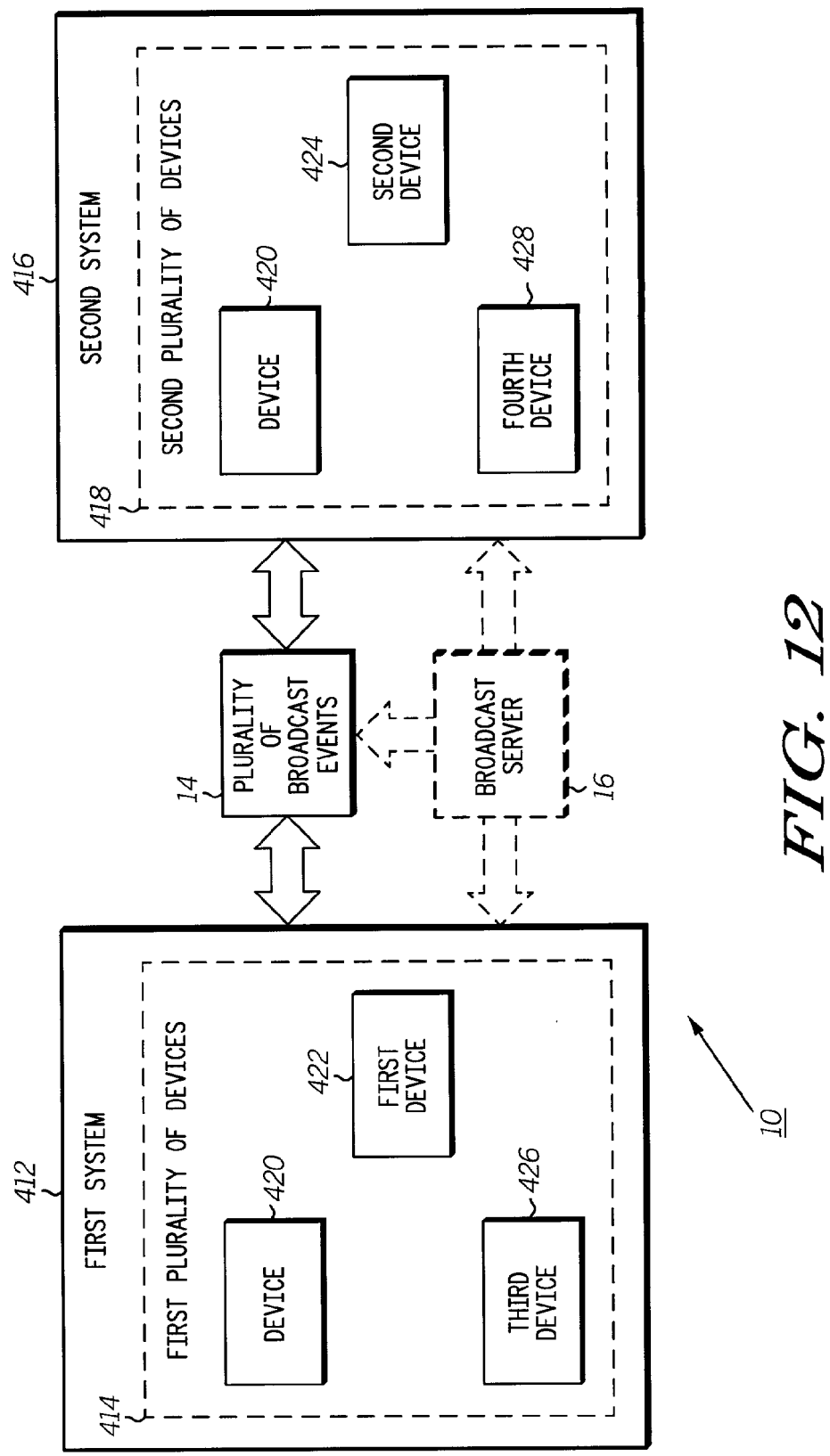

FIG. 12 is an electronic block diagram illustrating an alternative embodiment of the communication system 10 in accordance with the present invention. As illustrated, the communication system 10 preferably includes a first system 412 having a first plurality of devices 414, and a second system 416 having a second plurality of devices 418, the broadcast server 16, and the plurality of broadcast events 14. The first plurality of devices 414, for example, includes the device 420, the first device 422, and the third device 426. The second plurality of devices 418, for example, includes the device 420, the second device 424, and the fourth device 428. Preferably, the first system 412 and the second system 416 are coupled to the broadcast server 16. Alternatively, the first system 412 and the second system 416 can be coupled directly to the plurality of broadcast events 14. It will be appreciated by one of ordinary skill in the art that while only two systems are shown by way of example, multiple systems can be interconnected in a manner well known to one of ordinary skill in the art for the transfer of electronic information such as the plurality of client data 46 to the first plurality of devices 414 and the second plurality of devices 418.

It will be appreciated by one of ordinary skill in the art that, in accordance with the present invention, the first system 412 and the second system 416 can be the wireless communication system 276 of FIG. 9, the wired communication system 230 of FIG. 10, the broadcast communication system 398 of FIG. 11 or any other equivalent system. Further, in accordance with the present invention, the communication system 10 can include a plurality of wireless communication systems, a plurality of wired communication systems, or any combination thereof. Similarly, each client of the first plurality of devices 414 and the second plurality of devices 418 can be the mobile device 250 of FIG. 7, the network device 196 of FIG. 6, or the cable box 290 of FIG. 8.

Figure 13:
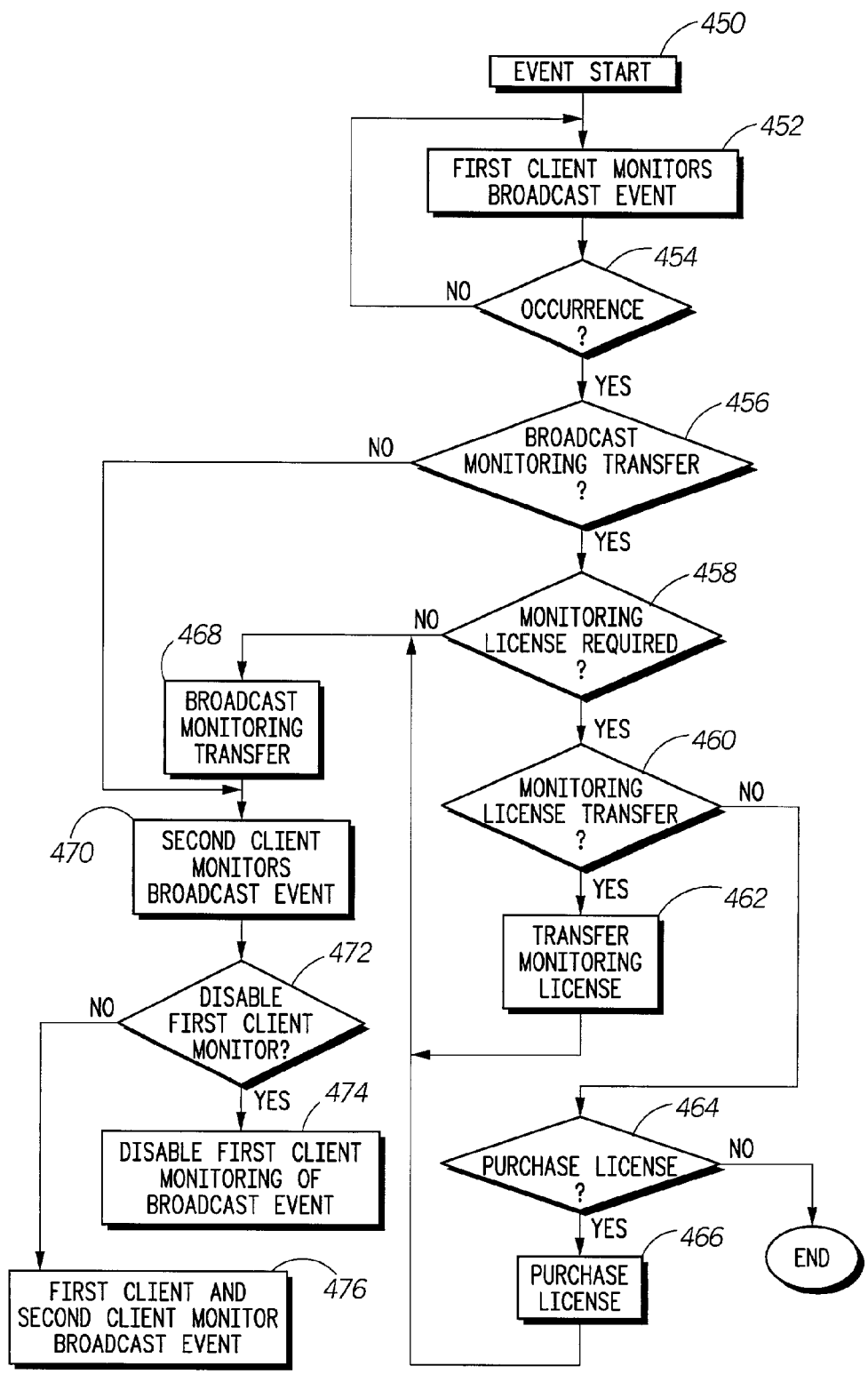
FIGS. 13 to 17 are flowcharts illustrating the operation of the communication system of FIG. 1, in accordance with the preferred embodiment of the present invention.

FIG. 13 is a flowchart illustrating the operation of the communication system 10 in accordance with the preferred embodiment of the present invention. Beginning with Step 450, the broadcast event 34 begins. The broadcast event 34, for example, can be one or a combination of broadcast events selected from a group consisting of a sports game, a simulcast concert, a television program, a networked program, and a radio program. Next, in Step 452, the first client 18 monitors the broadcast event 34. It will be appreciated by one of ordinary skill in the art that although one broadcast event is described herein, the process is equally applicable to a plurality of broadcast events. Typically, the account user 42 is monitoring the broadcast event 34 using the first client 18. It will be appreciated by one of ordinary skill in the art that the first client 18 can be operating within the first device 422 such as the first network device 384 of FIG. 10, the first mobile device 354 of FIG. 9, and/or the first cable box 404 of FIG. 11. Next, in Step 454, the process checks for the detection of an occurrence associated with the broadcast event 34. The occurrence for example, can include one or a combination of occurrences selected from a group consisting of the event start time 108, a user input received by the first client 18, a user input received by the second client 20, a deactivation of the first client 18, an activation of the second client 20, and an establishment of a communication connection between the first client 18 and the second client 20. Similarly, the occurrence can be the sending of a monitoring notification from the first client 18 to the second client 20, or alternatively the sending of a monitoring notification request from the second client 20 to the first client 18. When no occurrence is detected in Step 454, the process returns to Step 452 wherein the first client 18 continues to monitor the broadcast event 34. When an occurrence is detected in Step 454, next in Step 456, the process determines whether a broadcast monitoring transfer is required.

When a broadcast monitoring transfer is required in step 456, in Step 458, the process determines whether a monitoring license is required. When a monitoring license is required in Step 458, the process next determines in Step 460 whether the monitoring license can be transferred. In Step 462, when the monitoring license can be transferred, the transfer of the monitoring license takes place from the first client 18 to the second client 20 either directly or via the broadcast server 16. When a monitoring license cannot be transferred in Step 460, the process next determines in Step 464 whether the account user 42 wants to purchase a monitoring license. When the account user 42 agrees to purchase the monitoring license, in Step 466 the account user purchases the monitoring license. When the account user 42 does not purchase a monitoring license in step 464, the process ends.

After the account user purchases the monitoring license in Step 466, when no monitoring license is required in Step 458, and after the monitoring license has been transferred in Step 462, the process continues to Step 468. In Step 468, a broadcast monitoring transfer takes place. The broadcast monitoring transfer, for example, can include choosing the second client 20 from at least one transfer client profile stored in the first client 18. It will be appreciated by one of ordinary skill in the art that the stored transfer profile of the second client 20 can be linked to the broadcast event 34, to the broadcast channel 102 of the broadcast event 34, to the event time period 100 of the broadcast event 34, or any other attribute to assist in the choosing of the second client 20 for transferring the monitoring of the broadcast event 34. Further, when the communication system 10 includes the broadcast server 16, the broadcast monitoring transfer step can include using the broadcast server 16 for transferring the plurality of broadcast information 74 associated with the broadcast event 34. For example, the broadcast monitoring transfer step can include sending a monitoring notification from the first client 18 to the second client 20, sending a request for the plurality of broadcast information 74 associated with the broadcast event 34 from the second client 20 to the broadcast server 16, and receiving the plurality of broadcast information 74 from the broadcast server 16 by the second client 20. Alternatively, the broadcast monitoring step can include sending a request for the plurality of broadcast information 74 associated with the broadcast event 34 from the first client 18 to the broadcast server 16, receiving the plurality of broadcast information 74 from the broadcast server 16 by the first client 18, and sending a monitoring notification from the first client 18 to the second client 20 wherein the monitoring notification includes the plurality of broadcast information 74.

Next, and when no broadcast monitoring transfer is required in Step 456, in Step 470, the second client 20 monitors the broadcast event 34. It will be appreciated by one of ordinary skill in the art that the second client 20 can be operating within the second device 424 such as the second cable box 406 of FIG. 11, the second mobile device 356 of FIG. 9, and/or the second network device 386 of FIG. 10.

Figure 14:
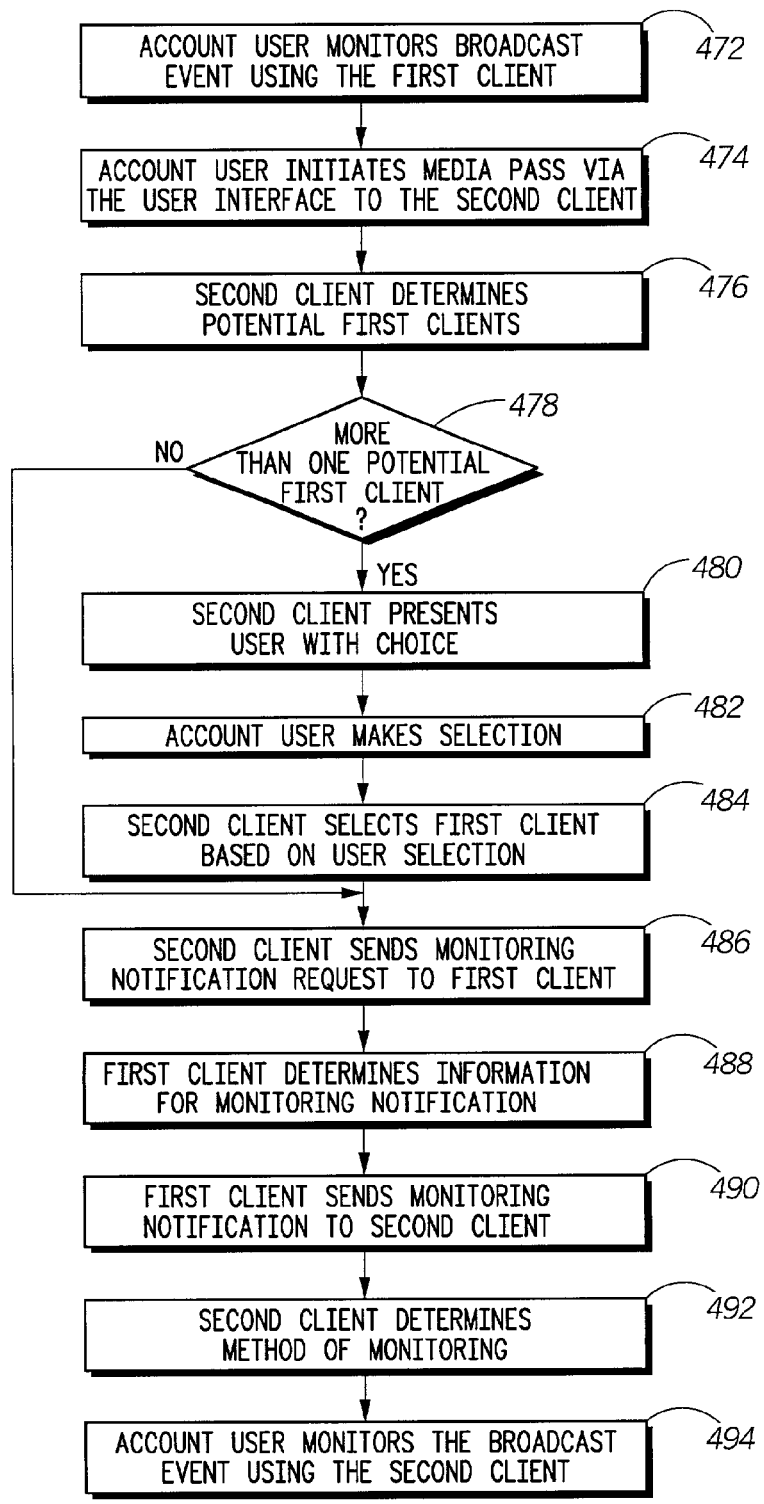

FIG. 14 is a flowchart illustrating the operation of the communication system 10 in accordance with the preferred embodiment of the present invention. Specifically, FIG. 14 illustrates the process when the account user 42 initiates the transfer of monitoring of one or more of the plurality of broadcast events 14 via the second client 20. Beginning in Step 472, the account user 42 monitors the broadcast event 34 using the first client 18. It will be appreciated by one of ordinary skill in the art that the first client 18 can be operating within the first device 422 such as the first network device 384 of FIG. 10, the first mobile device 354 of FIG. 9, and/or the first cable box 404 of FIG. 11. Next, in Step 474, the account user 42 initiates a "media pass" via the user interface to the second client 20. Next, in Step 476, the second client 20 determines potential first clients. The second client 20 can determine how many potential clients are available to the second client 20 for media pass transfers. For example, the second client 20 can access and review the stored plurality of transfer client profiles 58. Alternatively, the second client 20 can access a list of clients that are within communication range of the second client 20. This access can be accomplished via a network server or directly from the second client 20 to the plurality of clients 12, or any equivalent method as is well known in the art. Next, in Step 478, the process determines whether there are more than one potential first clients available to the second client 20. When there are more than one potential first clients, in Step 480 the second client 20 present the account user 42 with a choice. This choice can be the full list of the potential first clients or can be a list including the broadcast events they are monitoring. Alternatively, it could be a partial list (e.g. only events which have a broadcast event monitoring connection that the second client 20 is capable of monitoring). Next, in Step 482, the account user 42 responds to the choice by making a selection 18. Next, in Step 484, the second client 20 selects the first client 18 based on the account user's selection and retrieves the first client profile associated with the first client 18. Next, and when there is only one potential first client in Step 478, in Step 486, the second client 20 sends a monitoring notification request to the first client 18. The monitoring notification request, in accordance with the present invention, can include a request for a monitoring license, and/or a request for the plurality of broadcast information 74 associated with the broadcast event 34. The monitoring notification request can further include the second client's profile. Next, in Step 488, the first client 18 determines the information to be sent to the second client 20 in the monitoring notification such as current connection information, the plurality of broadcast information 74, a monitoring license, the first client's profile, and/or a time stamp. Next, in Step 490, the first client 18 sends the monitoring notification to the second client 20 either directly, via the broadcast server 16, via a communication system (such as the wireless communication system 276, the wired communication system 230, or the broadcast communication system 398), or any other method as is well known in the art. Next, in Step 492, the second client 20 receives the monitoring notification and uses the contents of the monitoring notification along with any user input received to determine the method of monitoring to be used for monitoring the broadcast event 34 on the second client 20. Next, in Step 494, the account user 42 monitors the broadcast event 34 using the second client 20. This monitored broadcast can be intentionally delayed where the delay is calculated to prevent the account user 42 from missing anything related to the broadcast event 34 due to changing from the first client 18 to the second client 20. The calculation can use the time-stamp that can be sent with the monitoring notification.

It will be appreciated by one of ordinary skill in the art that although one broadcast event is described herein for FIG. 14, the process is equally applicable to a plurality of broadcast events. Similarly, it will be appreciated by one of ordinary skill in the art that although the process herein described for FIG. 14 utilizes the first client 18 and the second client 20 by way of example, it is within the scope of the present invention to accomplish the transfer operations using a separate data transfer application within each device in which each client operates.

Figure 15:
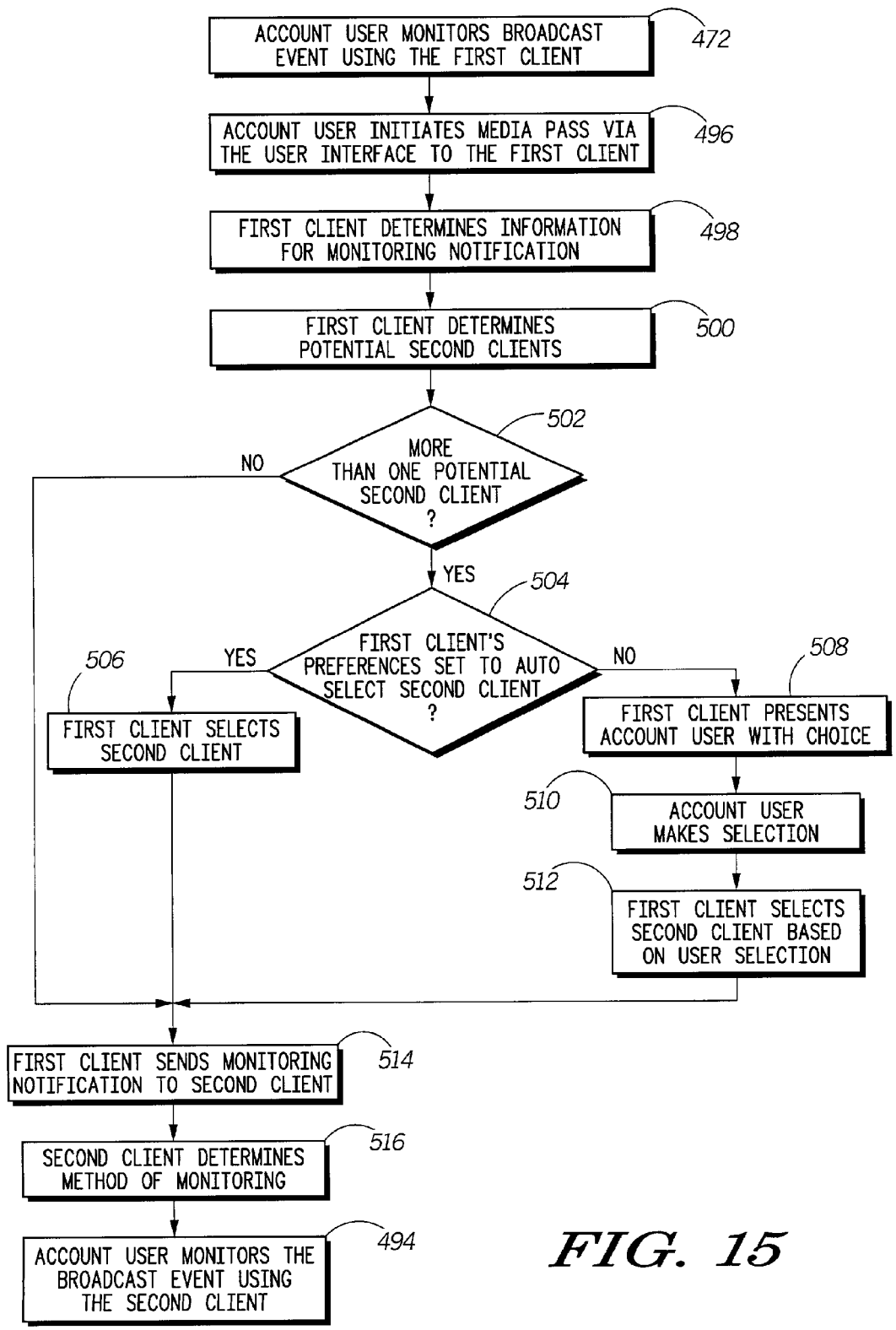

FIG. 15 is a flowchart illustrating the operation of the communication system 10 in accordance with the preferred embodiment of the present invention. Specifically, FIG. 15 illustrates the process when the account user 42 initiates the transfer of monitoring of one or more of the plurality of broadcast events 14 via the first client 18. Beginning in Step 472, the account user 42 monitors the broadcast event 34 using the first client 18. It will be appreciated by one of ordinary skill in the art that the first client 18 can be operating within the first device 422 such as the first network device 384 of FIG. 10, the first mobile device 354 of FIG. 9, and/or the first cable box 404 of FIG. 11. It will be further appreciated by one of ordinary skill in the art that although one broadcast event is described herein, the process is equally applicable to a plurality of broadcast events. Next, in Step 496, the account user 42 initiates a "media pass" via a user interface to the first client 18. Next, in Step 498, the first client 18 determines information to be included in a monitoring notification to be sent to the second client 20. For example, the monitoring notification can include current connection information, the plurality of broadcast information 74, a monitoring license, the first client's profile, and/or a time stamp. Next, in Step 500, the first client 18 determines potential second clients available for the transfer of the monitoring of the broadcast event 34. For example, the first client 18 can access and review the stored plurality of transfer client profiles 58. Alternatively, the first client 18 can access a list of clients that are within communication range of the first client 18. This access can be accomplished via a network server or directly from the first client 18 to the plurality of clients 12, or any equivalent method as is well known in the art. Next, in Step 502, the first client 18 determines whether there are more than one potential second clients available to the first client 18. In Step 504, when there are more than one potential second clients available to the first client 18, the process determines whether the first client's preferences are set to automatically select the second client 20. In Step 506, when the preferences are set to automatically select the second client 20, the first client 18 selects the second client 20. For example, the second client profile can be linked to the broadcast event 34, to the broadcast channel 102 of the broadcast event 34, to the event time period 100 of the broadcast event 34, of the event type, of the broadcast event connection, or to any other attribute of the broadcast event 34. The first client 18 then automatically chooses the second client 20 based on the linkages. Additionally, the first client 18 can automatically select the second client 20 based upon the second client 20 being authenticated by the first client 18 and/or the second client's user friendly name matching a user friendly name stored in the first client 18. When the first client's preferences are not set to automatically select the second client 20 in Step 504, in Step 508, the first client 18 presents a choice to the account user 42. This choice can be the full list of the potential second clients, a partial list of clients (e.g. only clients capable of using the connections available to monitor the broadcast event 34), a list of available broadcast event monitoring connections, or a list of broadcast event monitoring media types (e.g. audio, text, and video). Next, in Step 510, the account user 42 makes a selection. Next, in Step 512, the first client 18 selects the second client 20 based on the account user selection of the previous step.

After the second client 20 is selected either because there is only one potential second client in Step 502, or using Steps 506 or 512, in Step 514, the first client 18 sends a monitoring notification to the second client 54 either directly, via the broadcast server 16, or via a communication system. For example, the monitoring notification can include the plurality of broadcast information 74, a monitoring license, the first client's profile, and/or a time stamp. Next, in Step 516, the second client 20 determines the method of monitoring the broadcast event 34 using the information in the monitoring notification, information stored or programmed into the second client 20, and/or input from the account user 42. Next, in Step 494, the account user 42 monitors the broadcast event 34 using the second client 20.

It will be appreciated by one of ordinary skill in the art that although one broadcast event is described herein for FIG. 15, the process is equally applicable to a plurality of broadcast events. Similarly, it will be appreciated by one of ordinary skill in the art that although the process herein described for FIG. 15 utilizes the first client 18 and the second client 20 by way of example, it is within the scope of the present invention to accomplish the transfer operations using a separate data transfer application within each device in which each client operates.

Figure 16:
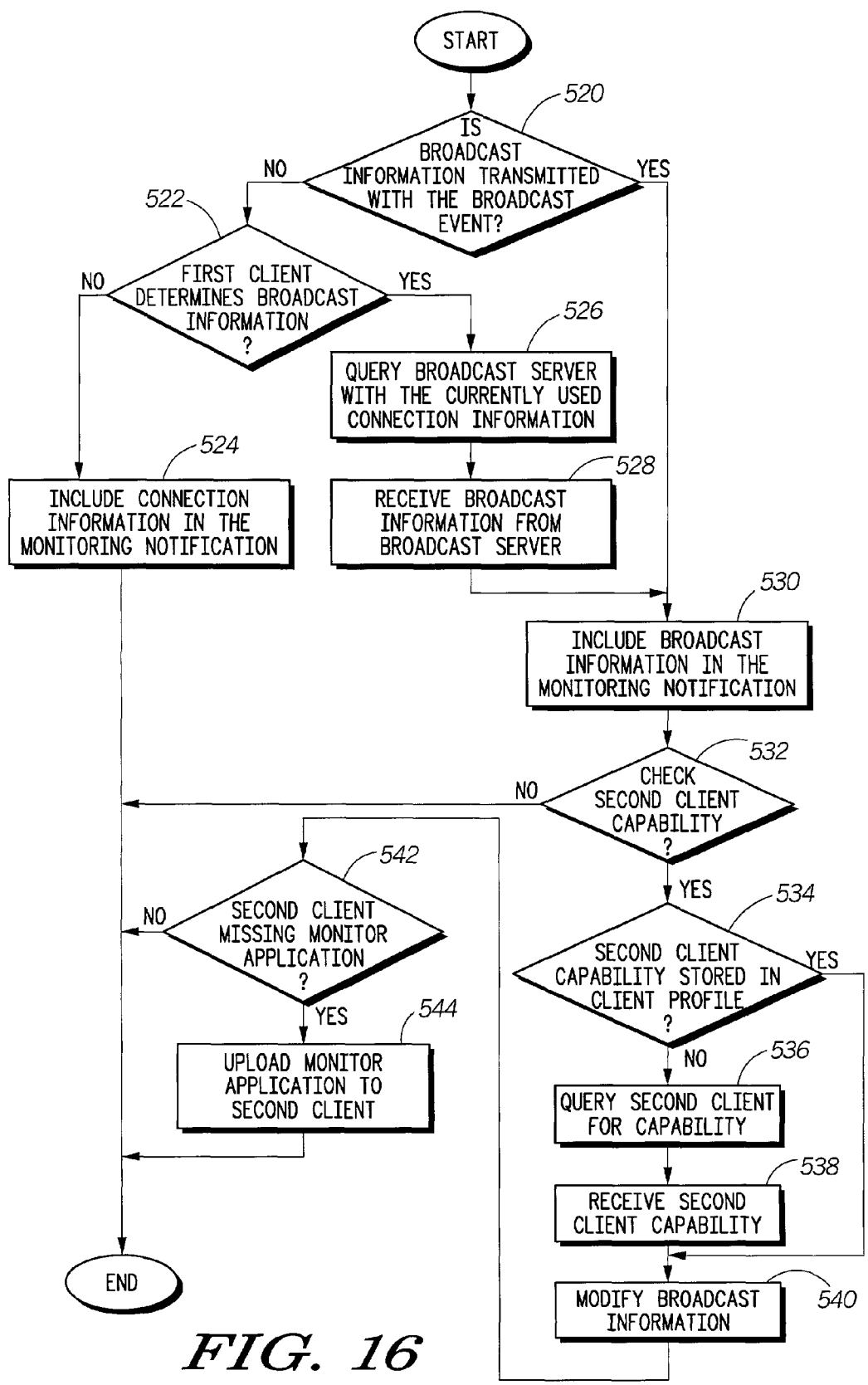

FIG. 16 is a flowchart illustrating the operation of the communication system 10 in accordance with the preferred embodiment of the present invention. Specifically, FIG. 16 illustrates more detail of Step 488 of FIG. 14 and Step 498 of FIG. 15 in which the first client 18 determines the information to be included in the monitoring notification. Beginning with Step 520, the first client 18 determines whether the plurality of broadcast information 74 is being transmitted with the currently monitored broadcast event 34. The plurality of broadcast information 74 can be transmitted directly with the transmitting of the broadcast event 34. Similarly, information such as a navigation path can be transmitted with the broadcast event 34 that indicates how to get the plurality of broadcast information 74. The first client 18 can then retrieve the plurality of broadcast information 74 using the transmitted information. When the plurality of information 74 or information to retrieve the plurality of broadcast information 74 is not transmitted with the broadcast event 34, in Step 522, the first client 18 determines if it is supposed to determine the plurality of broadcast information 74. This decision could be based on the system design (e.g. the system was designed to have the first client 18 retrieve the plurality of broadcast information 74), the first client capability, the first client's user preferences, or an equivalent. When the first client 18 is not supposed to determine the plurality of broadcast information 74, in Step 524, the connection information 104 is included in the monitoring notification. For example, the connection information 104 can be the channel being monitored (e.g. channel 35), the system being monitored (e.g. Adelphia cable in Boynton Beach, Fla., USA), and a time stamp. Similarly, the connection information 104 can be a URI or a URL, a broadcaster's call letters, and/or the FM frequency being monitored (e.g. 92.7) along with a location (e.g. Palm Beach County). It will be appreciated by one of ordinary skill in the art that the connection information 104 can be any of the information mentioned herein or an equivalent. The process of determining the information to be included in the monitoring notification then ends.

In Step 526, when the first client 18 is supposed to determine the plurality of broadcast information 74 in Step 522, the first client 18 uses the connection information 104 to query the broadcast server 16 to determine the broadcast event 34 being monitored from the connection information 104. Next, in Step 528, the first client 18 receives the plurality of broadcast information 74 including the connection information 104 from the broadcast server 16. Next, in Step 530, and when the broadcast information 104 is transmitted with the broadcast event 34, the first client 18 includes the plurality of broadcast information 74 in the monitoring notification. For example, the first client 18 determines all of the possible ways that the broadcast event 34 can be monitored and includes this in the connection information 104 as part of the plurality of broadcast information 74. Next, in Step 532, the first client 18 determines whether it is supposed to use the second client profile to modify the plurality of broadcast information 74 to more properly fit the second client's capabilities prior to sending the monitoring notification. This determination can be based on system design, first client capability, first client user preferences, or an equivalent. When the first client 18 is not supposed to modify the plurality of broadcast information in Step 532, the process of determining the information to be included in the monitoring notification then ends.

In Step 534, when the first client 18 is supposed to modify the plurality of broadcast information 74 to fit the capabilities of the second client 20 prior to sending the monitoring notification, the first client 18 determines whether the second client capabilities are stored and available to the first client 18. For example, the second client profile can be included in the plurality of transfer client profiles 58 stored either in the first client 18, or in a memory of the device in which the first client 18 operates, or an equivalent. In Step 536, when the first client 18 does not have access to a stored client profile for the second client 20, the first client 18 queries the second client 20 for the second client's capabilities. Next, in Step 538, the first client 18 receives the second client's capabilities from the second client 20. Next, and when the first client 18 has access to the stored client profile of the second client 20 in Step 534, the first client 18 modifies the plurality of broadcast information 74 to match the capabilities of the second client 20 prior to including it in the monitoring notification. Next, in Step 542, the process determines whether the second client 20 is missing an application required to monitor the broadcast event 34. This determination can be made either by the second client 20 notifying the first client 18 of the missing application, by the broadcast server 16 notifying the first client 18 of the missing application, by the first client 18 using the second client profile to determine the missing application, or an equivalent. When the second client 20 is not missing an application required for monitoring the broadcast event 34, the process of determining the information to be included in the monitoring notification then ends. In Step 544, when the second client 20 is missing an application in Step 542, the first client 18 sends the application to the second client 20. For example, the first client 20 can have stored the application locally, the application can have been transmitted with the broadcast event 34, or the first client 18 can have downloaded the application from the Internet. Alternatively, the first client 18 can send the second client 20 the navigation path to retrieve the missing application. The process of determining the information to be included in the monitoring notification then ends.

It will be appreciated by one of ordinary skill in the art that although one broadcast event is described herein for FIG. 16, the process is equally applicable to a plurality of broadcast events. Similarly, it will be appreciated by one of ordinary skill in the art that although the process herein described for FIG. 16 utilizes the first client 18 and the second client 20 by way of example, it is within the scope of the present invention to accomplish the transfer operations using a separate data transfer application within each device in which each client operates.

Figure 17:
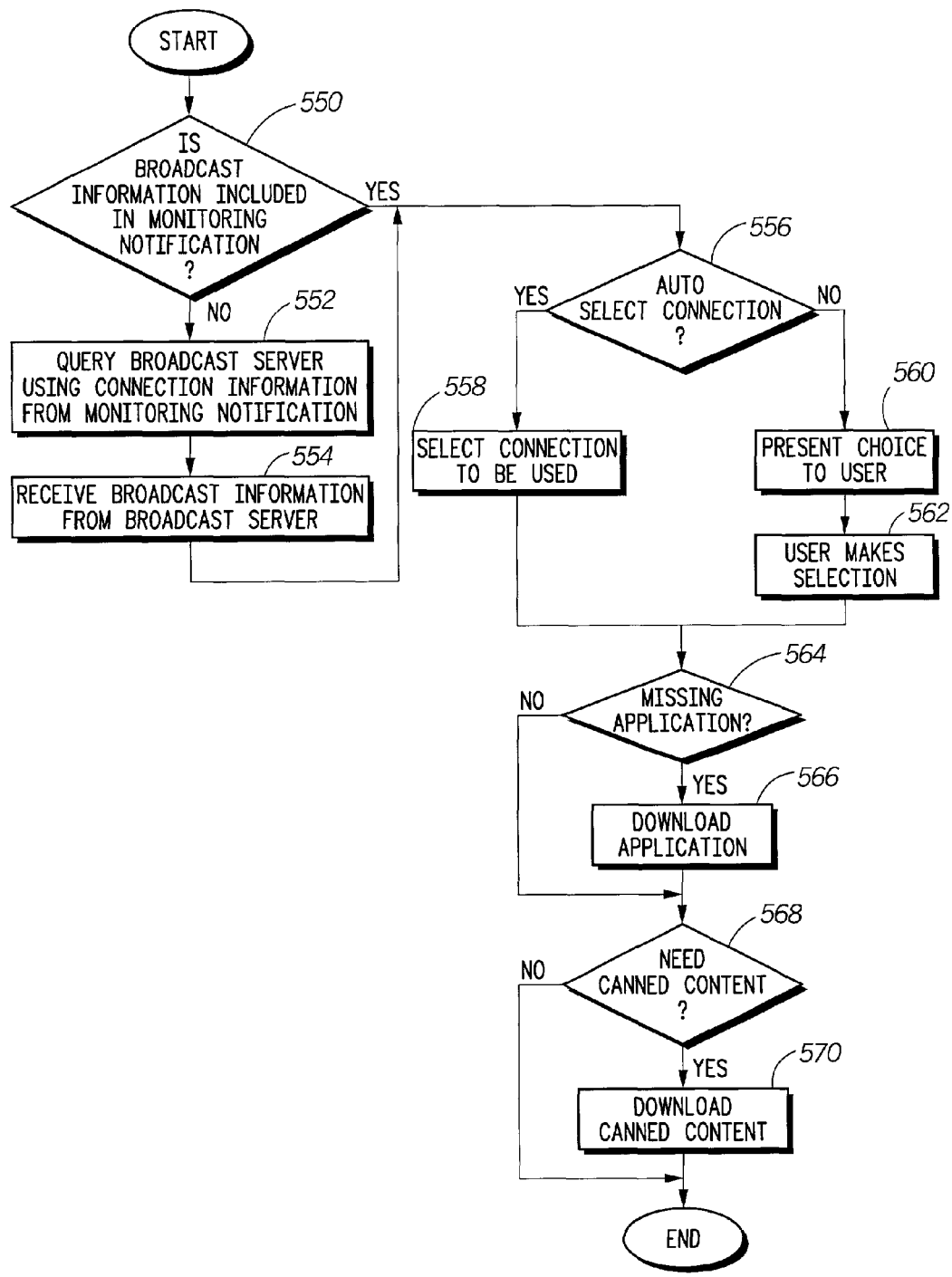

FIG. 17 is a flowchart illustrating the operation of the communication system 10 in accordance with the preferred embodiment of the present invention. Specifically, FIG. 17 illustrates more detail of Step 492 of FIG. 14 and Step 516 of FIG. 15 in which the second client 20 determines the method of monitoring. Beginning with Step 550, the second client 20 determines whether the plurality of broadcast information 74 was included in the monitoring notification sent by the first client 18. In Step 552, when the plurality of broadcast information 74 was not included in the monitoring notification, the connection information 104 is used to query the broadcast server 16 which will determine the broadcast event being monitored from the connection information 104. The broadcast server 16 can determine all of the possible ways that the broadcast event 34 can be monitored and include this in the connection information as part of the plurality of broadcast information 74. Next, in Step 554, the second client 20 receives the plurality of broadcast information 74 from the broadcast server 16. Next, and when the plurality of broadcast information 74 was included in the monitoring notification in Step 550, in Step 556, the process determines whether the second client 20 is supposed to automatically select the connection to use. For example, when the device in which the second client 20 is operating is capable of streaming video, streaming audio, making phone calls, and tuning to FM radio, and all are connection types that can be used to monitor the broadcast event, the second client 20 can be programmed to determine which connection to choose. Whether or not the second client 20 should automatically select a connection could depend on the number of types of connections capable of monitoring the event (e.g. if only 1 connection, auto decide). It can also depend on the user preferences or the client capability (e.g. client can't auto decide). When the second client 20 is to automatically select the connection in Step 556, in Step 558 the second client 20 selects the connection to use to monitor the broadcast event 34. For example, the selection can be based on the user preferences (e.g. pick the cheapest, pick the most feature rich) or can be based on client capability (e.g. can only monitor FM radio stations). In Step 560, when the second client 20 does not automatically select the connection, the second client 20 presents a choice to the account user 42. This choice can be the full list of the potential connections, a partial list of connections (e.g. only connections the second client 20 is capable of using to monitor the broadcast event 34), the name of the connection, the connection type (radio, TV, http, tcp/ip, RealVideo, or an equivalent), and/or the media type (e.g. text updates, audio clips, video, or an equivalent). Next, in Step 562, the account user 42 makes a selection.

After Step 562 and after Step 558, in Step 564, the process determines whether the second client 20 is missing an application required to monitor the broadcast event 34. This determination can be made either by the first client 18 notifying the second client 20 of the required application, by the broadcast server 16 notifying the second client 20 of the required application, or an equivalent. In Step 566, when the second client 20 is missing an application in Step 564, the second client 20 downloads the missing application. For example the second client 20 can receive the application from the first client 18, the second client 20 can download the application from the broadcast server 16, the second client 20 can download the application from the Internet, or an equivalent. Next, and when no applications were missing in Step 564, the process determines in Step 568 whether canned content is needed. When no canned content is needed, the process ends. When canned content is needed in Step 568, in Step 570 the second client 20 downloads the canned content. For example, if the media for monitoring the broadcast event can use canned content, the second client 20 can download it. It can be downloaded from a separate server, the broadcast server 16, the first client 18, or an equivalent. The process then ends.

It will be appreciated by one of ordinary skill in the art that although one broadcast event is described herein for FIG. 17, the process is equally applicable to a plurality of broadcast events. Similarly, it will be appreciated by one of ordinary skill in the art that although the process herein described for FIG. 17 utilizes the first client 18 and the second client 20 by way of example, it is within the scope of the present invention to accomplish the transfer operations using a separate data transfer application within each device in which each client operates.

Although the invention has been described in terms of preferred embodiments, it will be obvious to those skilled in the art that various alterations and modifications can be made without departing from the invention. Accordingly, it is intended that all such alterations and modifications be considered as within the spirit and scope of the invention as defined by the appended claims.

What is claimed is:

1. A method comprising:
   monitoring at least one broadcast event by a first client of a plurality of clients;
   storing, in the first client, at least one transfer client profile, wherein the transfer client profile comprises a first client profile associated with the first client and a second client profile associated with a second client; and
   initiating, by the first client, a monitoring of the at least one broadcast event by the second client in response to an ability of the second client being sufficient to monitor the at least one broadcast event and in response to an occurrence associated with the at least one broadcast event to transfer the monitoring of the at least one broadcast event from the first client to the second client,
   wherein the first client operates within a first system connected to a broadcast server to receive the broadcast event independent of a second system comprising the second client.

2. The method of claim 1 further comprising: disabling monitoring of the at least one broadcast event by the first client.

3. The method of claim 1 further comprising:
   transferring a monitoring license from the first client to the second client prior to launching the monitoring of the at least one broadcast event by the second client.

4. The method of claim 1 wherein the at least one broadcast event comprises one or a combination of broadcast events selected from a group consisting of a sports game, a simulcast concert, a television program, a networked program, and a radio program.

5. The method of claim 1 wherein the occurrence comprises one or a combination of occurrences selected from a group comprising an event start time, a user input received by the first client, a user input received by the second client, a deactivation of the first client, an activation of the second client, and an establishment of a communication connection between the first client and the second client.

6. The method of claim 1 wherein the first client operates within a first device and further wherein the second client operates within a second device.

7. The method of claim 6 wherein the first device is a device selected from a group comprising of a network device, a mobile device, and a cable box.

8. The method of claim 6 wherein the second device is a device selected from a group comprising a network device, a mobile device, and a cable box.

9. The method of claim 1 further comprising:
   choosing the second client from the stored at least one transfer client profile.

10. The method of claim 1 further comprising:
    linking the second client profile with the at least one broadcast event; and
    retrieving from storage the second client profile linked to the at least one broadcast event.

11. The method of claim 1 further comprising:
    linking the second client profile with a broadcast channel;
    identifying the broadcast channel associated with the at least one broadcast event; and
    retrieving from storage the second client profile linked to the at least one broadcast channel.

12. The method of claim 1 further comprising:
    scheduling a monitoring of the at least one broadcast event by the second client profile for a time period; and
    retrieving from storage the second client profile in response to a determination that the time period has been reached.

13. The method of claim 1, further comprising:
    sending a monitoring notification from the first client to the second client, wherein the monitoring notification comprises a broadcast channel identifier;
    sending a request for a plurality of broadcast information associated with the at least one broadcast event from the second client to a broadcast server; and
    receiving the plurality of broadcast information from the broadcast server by the second client.

14. The method of claim 13 wherein the monitoring notification further comprises a time stamp.

15. The method of claim 13 wherein the plurality of broadcast information comprises one or a combination of broadcast information selected from a group comprising an event start time, an event end time, a plurality of event connection information, and a plurality of media information.

16. The method of claim 15 wherein the plurality of media information comprises a plurality of canned content information.

17. The method of claim 1, further comprising:
    sending a request for a plurality of broadcast information associated with the at least one broadcast event from the first client to a broadcast server;
    receiving the plurality of broadcast information from the broadcast server by the first client; and
    sending a monitoring notification from the first client to the second client, wherein the monitoring notification comprises the plurality of broadcast information.

18. The method of claim 17 wherein the plurality of broadcast information comprises one or a combination of broadcast information selected from a group comprising an event start time, an event end time, a plurality of event connection information, and a plurality of media information.

19. The method of claim 18 wherein the plurality of media information comprises a plurality of canned content information.

20. The method of claim 1 further comprising:
    sending a monitoring notification from the first client to the second client;

requesting a plurality of broadcast information by the second client prior to initiating the monitoring of the at least one broadcast event by the second client in response to the monitoring notification; and sending the plurality of broadcast information from the first client to the second client in response to the requesting.

21. The method of claim 20 wherein the plurality of broadcast information comprises one or a combination of broadcast information selected from a group comprising an event start time, an event end time, a plurality of event connection information, and a plurality of media information.

22. The method of claim 21 wherein the plurality of media information comprises a plurality of canned content information.

23. The method of claim 1 wherein the occurrence comprises:

sending a monitoring notification from the first client to the second client.

24. The method of claim 23 wherein the monitoring notification comprises a plurality of broadcast information.

25. The method of claim 24 wherein the plurality of broadcast information comprises one or a combination of broadcast information selected from a group comprising an event start time, an event end time, a plurality of event connection information, and a plurality of media information.

26. The method of claim 25 wherein the plurality of media information comprises a plurality of canned content information.

27. The method of claim 1 wherein the occurrence comprises:

sending a monitoring notification from the second client to the first client.

28. The method of claim 27 wherein the monitoring notification comprises a request for a plurality of broadcast information.

29. The method of claim 27 wherein the monitoring notification comprises the second client profile.

30. A non-transitory computer-readable medium having instructions stored thereon that, when executed by a processing device, cause the processing device to perform a method comprising:

monitoring at least one broadcast event by a first client on a first device;

storing, in the first client, at least one transfer client profile, wherein the transfer client profile comprises at least one of a first client profile associated with the first client and a second client profile associated with a second client of a second device; and initiating, by the first client, a monitoring of the at least one broadcast event by the second client on the second device in response to an ability of the second device being sufficient to monitor the at least one broadcast event and in response to an occurrence associated with the at least one broadcast event to transfer the monitoring of the at least one broadcast event from the first client to the second client;

wherein the first device operates within a first system connected to a broadcast server to receive the broadcast event independent of a second system comprising the second client.

31. The non-transitory computer-readable medium of claim 30, wherein the method further comprises: disabling monitoring of the at least one broadcast event by the first device.

32. The non-transitory computer-readable medium of claim 30, wherein the method further comprises:

transferring a monitoring license from the first device to the second device prior to initiating the monitoring of the at least one broadcast event by the second client.

33. The non-transitory computer-readable medium of claim 30 wherein the at least one broadcast event comprises one or a combination of broadcast events selected from a group comprising a sports game, a simulcast concert, a television program, a networked program, and a radio program.

34. The non-transitory computer-readable medium of claim 30 wherein the first system comprises one or a combination of systems selected from a group comprising a wired communication system, a wireless communication system, and a broadcast communication system.

35. The non-transitory computer-readable medium of claim 30 wherein the second system comprises one or a combination of systems selected from a group comprising a wired communication system, a wireless communication system, and a broadcast communication system.

36. The non-transitory computer-readable medium of claim 30, wherein the method further comprises:

sending a monitoring notification from a first transfer application operating within the first device to a second transfer application operating within the second device, wherein the monitoring notification comprises a broadcast channel;

sending a request for a plurality of broadcast information associated with the at least one broadcast event from the second transfer application to a broadcast server; and receiving the plurality of broadcast information from the broadcast server by the second device.

37. The non-transitory computer-readable medium of claim 36 wherein the plurality of broadcast information comprises one or a combination of broadcast information selected from a group comprising an event start time, an event end time, a plurality of event connection information, and a plurality of media information.

38. The non-transitory computer-readable medium of claim 37 wherein the plurality of media information comprises a plurality of canned content information.

39. The non-transitory computer-readable medium of claim 36, wherein a plurality of canned content information is associated with the at least one broadcast event, the method further comprising:

determining the plurality of canned content information by the second device in response to the receiving of the plurality of broadcast information.

40. The non-transitory computer-readable medium of claim 30, wherein the method further comprises:

sending a request for a plurality of broadcast information associated with the at least one broadcast event from a first transfer application operating within the first device to a broadcast server of the communication system;

receiving the plurality of broadcast information from the broadcast server by the first transfer application; and sending a monitoring notification from the first transfer application to a second transfer application operating within the second device, wherein the monitoring notification comprises the plurality of broadcast information.

41. The non-transitory computer-readable medium of claim 40 wherein the plurality of broadcast information comprises one or a combination of broadcast information selected from a group comprising an event start time, an event end time, a plurality of event connection information, and a plurality of canned content information.

42. The non-transitory computer-readable medium of claim 40, wherein a plurality of canned content information is associated with the at least one broadcast event, the method further comprising:
receiving the monitoring notification comprising the plurality of broadcast information by the second transfer application operating within the second device; and
determining the plurality of canned content information by the second device in response to the receiving of the monitoring notification comprising the plurality of broadcast information.

43. The non-transitory computer-readable medium of claim 30, wherein the method further comprises:
sending a monitoring notification from a first transfer application operating within the first device to a second transfer application operating within the second device;
requesting a plurality of broadcast information by the second transfer application prior to the initiating the monitoring of the at least one broadcast event by the second client in response to the monitoring notification; and
sending the plurality of broadcast information from the first transfer application to the second transfer application.

44. The non-transitory computer-readable medium of claim 43 wherein the plurality of broadcast information comprises one or a combination of broadcast information selected from a group comprising an event start time, an event end time, a plurality of event connection information, and a plurality of media information.

45. The non-transitory computer-readable medium of claim 44 wherein the plurality of media information comprises a plurality of canned content information.

46. The non-transitory computer-readable medium of claim 43, wherein a plurality of canned content information is associated with the at least one broadcast event, the method further comprising:
receiving the plurality of broadcast information by the second transfer application operating within the second device; and
determining the plurality of canned content information by the second device in response to the receiving of the plurality of broadcast information.

47. The non-transitory computer-readable medium of claim 30 wherein the occurrence comprises:
sending a monitoring notification from a first transfer application operating within the first device to a second transfer application operating within the second device.

48. The non-transitory computer-readable medium of claim 47 wherein the monitoring notification comprises a plurality of broadcast information.

49. The non-transitory computer-readable medium of claim 48 wherein the plurality of broadcast information comprises one or a combination of broadcast information selected from a group comprising an event start time, an event end time, a plurality of event connection information, and a plurality of media information.

50. The non-transitory computer-readable medium of claim 49 wherein the plurality of media information comprises a plurality of canned content information.

51. The non-transitory computer-readable medium of claim 48 wherein a plurality of canned content information is associated with the at least one broadcast event, the method further comprising:
receiving the monitoring notification comprising the plurality of broadcast information by the second transfer application operating within the second device; and
determining the plurality of canned content information by the second device in response to the receiving of the monitoring notification comprising the plurality of broadcast information.

52. The non-transitory computer-readable medium of claim 30 wherein the occurrence comprises:
sending a monitoring notification from a second transfer application operating within the second device to a first transfer application operating within the first device.

53. The non-transitory computer-readable medium of claim 52 wherein the monitoring notification comprises a request for a plurality of broadcast information.

54. The non-transitory computer-readable medium of claim 52 wherein the monitoring notification comprises a plurality of second client connection information.

55. The non-transitory computer-readable medium of claim 30 wherein the occurrence comprises one or a combination of occurrences selected from a group comprising an event start time, a user input received by the first device, a user input received by the second device, a detection of movement of the second device, a deactivation of the first device, a deactivation of the first client, an activation of the second device, an activation of a first transfer application operating within the first device, an activation of a second transfer application operating within the second device, and an establishment of a communication connection between the first device and the second device.

56. The non-transitory computer-readable medium of claim 30 , wherein the method further comprises:
downloading an event monitoring application by the second device prior to the launching.

57. The non-transitory computer-readable medium of claim 56, wherein the method further comprises:
receiving a navigational path from the first device by the second device prior to the downloading of the event, wherein the downloading of the event comprises downloading the event monitoring application using the navigational path.

58. The non-transitory computer-readable medium of claim 30, wherein the method further comprises:
sending an event monitoring application from the first device to the second device prior to the initiating the monitoring of the at least one broadcast event by the second client.

59. A method comprising:
monitoring at least one broadcast event by a first client on a first device;
transferring a plurality of broadcast information associated with the at least one broadcast event from the first device to a second device;
storing, in the first client, at least one transfer client profile, wherein the transfer client profile comprises a first client profile associated with the first client, a second client profile associated with the second client, and a third client profile associated with a third client of a third device;
sending the plurality of broadcast information from the second device to the third device in response to an occurrence associated with the at least one broadcast event; and
initiating, by the first client, a monitoring of the at least one broadcast event by the third client on the third device in response to an ability of the third device being sufficient to monitor the at least one broadcast event and in response to receiving the plurality of broadcast information sent from the second device to transfer the monitoring of the at least one broadcast event from the first client to the third client;

wherein at least one of the first device, the second device, or the third device operates within a first system connected to a broadcast server to receive the broadcast event independent of a second system comprising at least another of the first device, the second device, or the third device.

60. The method of claim 59 wherein the occurrence comprises one or a combination of occurrences selected from a group comprising an event start time, a user input received by the first device, a user input received by the second device, a user input received by the third device, a detection of movement of the third device, a deactivation of the first device, a deactivation of the first client, an activation of the third device, an activation of a first transfer application operating within the first device, an activation of a second transfer application operating within the second device, an activation of a third transfer application operating within the third device, an establishment of a communication connection between the first device and the second device, and an establishment of a communication connection between the second device and the third device.

61. A communication system comprising:
a plurality of clients comprising:
a first client for monitoring at least one broadcast event, the first client further to:
store, in the first client, at least one transfer client profile, wherein the transfer client profile comprises a first client profile associated with the first client and a second client profile associated with the second client; and
initiate a monitoring of the at least one broadcast event, by the second client, in response to an ability of the second client being sufficient to monitor the at least one broadcast event and in response to an occurrence associated with the at least one broadcast event to transfer the monitoring of the at least one broadcast event from the first client to the second client;
wherein the communication system comprises a first system and a second system, wherein the first client operates within the first system connected to a broadcast server to receive the broadcast event independent of a second system comprising the second client.

62. The communication system of claim 61 wherein a monitoring license is associated with the at least one broadcast event, and further wherein the first client transfers the monitoring license to the second client.

63. The communication system of claim 61 wherein the at least one broadcast event comprises one or a combination of broadcast events selected from a group comprising a sports game, a simulcast concert, a television program, a networked program, and a radio program.

64. The communication system of claim 61 wherein the occurrence comprises one or a combination of occurrences selected from a group comprising an event start time, a user input received by the first client, a user input received by the second client, a deactivation of the first client, an activation of the second client, and an establishment of a communication connection between the first client and the second client.

65. The communication system of claim 61 wherein the first client operates within a first device and further wherein the second client operates within a second device.

66. The communication system of claim 65 wherein the first device is a device selected from a group comprising a network device, a mobile device, and a cable box.

67. The communication system of claim 65 wherein the second device is a device selected from a group comprising a network device, a mobile device, and a cable box.

68. The communication system of claim 61 wherein the first system comprises one or a combination of systems selected from a group comprising a wired communication system, a wireless communication system, and a broadcast communication system.

69. The communication system of claim 61 wherein the second system comprises one or a combination of systems selected from a group comprising a wired communication system, a wireless communication system, and a broadcast communication system.

70. The communication system of claim 65 wherein the first device chooses the second device to monitor the at least one broadcast event.

71. The communication system of claim 70 wherein the first device comprises a stored link of the second client profile to the at least one broadcast event.

72. The communication system of claim 70 wherein the at least one broadcast event is associated with a broadcast channel, and further wherein the first device comprises a stored link of the second client profile with the broadcast channel.

73. The communication system of claim 70 wherein the at least one broadcast event is associated with a time period, and further wherein the first device includes a stored link of the second client profile with the associated time period.

74. The communication system of claim 61 further comprising:
at least one broadcast server coupled to the plurality of clients, wherein the broadcast server comprises:
a server memory for storing a plurality of broadcast information associated with the at least one broadcast event,
a server receiver for receiving a request for the plurality of broadcast information,
a server processor coupled to the server memory and to the server receiver for processing the received request and for sending a transmission command to a server transmitter, and the server transmitter coupled to the server processor for sending the plurality of broadcast information to the second client.

75. The communication system of claim 74 wherein the plurality of broadcast information comprises one or a combination of broadcast information selected from a group comprising an event start time, an event end time, a plurality of event connection information, and a plurality of media information.

76. The communication system of claim 75 wherein the plurality of media information comprises a plurality of canned content information.

77. A communication system comprising:
a plurality of devices comprising:
a first device comprising:
a first client for monitoring at least one broadcast event; and
a first transfer application coupled to the first client for sending a monitoring notification and to store, in the first client, at least one transfer client profile comprising a second client profile associated with a second device, wherein the first transfer application chooses the second device to monitor the at least one broadcast event; and the second device comprising:

a second transfer application for receiving the monitoring notification; and a second client coupled to the second transfer application for launching monitoring of the at least one broadcast event in response to receiving the monitoring notification from the first device to transfer the monitoring of the at least one broadcast event from the first device to the second device and further in response to detecting, by the first device, an ability of the second device as being sufficient to monitor the at least one broadcast event;

wherein the communication system comprises a first system and a second system, wherein the first device operates within the first system and further wherein the second device operates within the second system.

78. The communication system of claim 77 wherein the first device comprises a stored link of the second client profile to the at least one broadcast event.

79. The communication system of claim 77 wherein the at least one broadcast event is associated with a broadcast channel, and further wherein the first device comprises a stored link of the second client profile with the broadcast channel.

80. The communication system of claim 77 wherein the at least one broadcast event is associated with a time period, and further the first device includes a stored link of the second client profile with the associated time period.

81. The communication system of claim 77 further comprising:

at least one broadcast server coupled to the plurality of devices, wherein the broadcast server comprises:

a server memory for storing a plurality of broadcast information associated with the at least one broadcast event;

a server receiver for receiving a request for the plurality of broadcast information; and a server processor coupled to the server memory and to the server receiver for processing the received request and for sending a transmission command to a server transmitter; and the server transmitter coupled to the server processor for sending the plurality of broadcast information to the second device.

* * * * *